(12) United States Patent
Ishibashi

(10) Patent No.: US 12,456,928 B2
(45) Date of Patent: Oct. 28, 2025

(54) POWER CONVERSION APPARATUS AND POWER CONVERSION SYSTEM

(71) Applicant: TDK CORPORATION, Tokyo (JP)

(72) Inventor: Naoyuki Ishibashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 204 days.

(21) Appl. No.: 18/284,261

(22) PCT Filed: Mar. 30, 2021

(86) PCT No.: PCT/JP2021/013484
§ 371 (c)(1),
(2) Date: Sep. 26, 2023

(87) PCT Pub. No.: WO2022/208644
PCT Pub. Date: Oct. 6, 2022

(65) Prior Publication Data
US 2024/0072676 A1    Feb. 29, 2024

(51) Int. Cl.
*H02M 3/335* (2006.01)
*H02M 1/00* (2006.01)
*H02M 1/10* (2006.01)
*H02M 3/00* (2006.01)

(52) U.S. Cl.
CPC ..... *H02M 3/33576* (2013.01); *H02M 1/0058* (2021.05); *H02M 1/10* (2013.01); *H02M 3/01* (2021.05); *H02M 3/33569* (2013.01)

(58) Field of Classification Search
CPC ...... H02M 3/33576; H02M 3/01; H02M 1/10; H02M 3/33569; H02M 3/33584; H02M 1/0058; Y02B 70/10
See application file for complete search history.

(56) References Cited

U.S. PATENT DOCUMENTS 5,434,768 A * 7/1995 Jitaru ............... H02M 3/33569
363/21.01
5,684,683 A * 11/1997 Divan .................. H02M 3/285
363/71
6,064,580 A * 5/2000 Watanabe ......... H02M 3/33592
363/127

(Continued)

FOREIGN PATENT DOCUMENTS

JP    2019-187021 A    10/2019

*Primary Examiner* — Yusef A Ahmed
(74) *Attorney, Agent, or Firm* — Oliff PLC

(57) ABSTRACT

A power conversion apparatus includes: a first power terminal; a first arm including a first switching device between a first coupling terminal and a first node, a second switching device between the first node and a second node, and a third switching device between the second node and a second coupling terminal; a second arm including a fourth switching device between the first coupling terminal and a third node, a fifth switching device between the third node and a fourth node, and a sixth switching device between the fourth node and the second coupling terminal; a first inductor between the second node and a fifth node; a second inductor between the fourth and fifth nodes: a first capacitor between the fifth node and the second coupling terminal; a first transformer including a first winding and a second winding; a rectifying circuit; a second power terminal; and a control circuit.

13 Claims, 16 Drawing Sheets

(56) References Cited

U.S. PATENT DOCUMENTS

| | | | |
|---|---|---|---|
| 6,862,195 B2* | 3/2005 | Jitaru | H02M 3/3376 363/17 |
| 9,590,531 B2* | 3/2017 | Pahlevaninezhad | H02M 7/53871 |
| 10,027,130 B2* | 7/2018 | Cho | H02J 50/10 |
| 10,819,244 B1* | 10/2020 | Shi | H02M 3/33569 |
| 11,351,881 B1* | 6/2022 | Park | B60L 53/22 |
| 11,705,817 B2* | 7/2023 | Fu | H02M 3/01 363/21.02 |
| 2012/0081927 A1* | 4/2012 | Matsumoto | H02M 3/33523 363/21.05 |
| 2014/0009968 A1* | 1/2014 | Matsuura | H02M 3/33592 363/17 |
| 2014/0268908 A1* | 9/2014 | Zhou | H02M 7/5381 363/37 |
| 2015/0048681 A1* | 2/2015 | Kwasinski | H02M 3/33569 307/52 |
| 2015/0055374 A1* | 2/2015 | Yamashita | H02M 3/01 363/17 |
| 2015/0109829 A1* | 4/2015 | Usami | H02M 1/4258 363/17 |
| 2017/0222562 A1* | 8/2017 | Nakahori | H02M 1/08 |
| 2018/0337610 A1* | 11/2018 | Leong | H02M 1/083 |
| 2019/0229632 A1* | 7/2019 | Ishibashi | H02M 3/33576 |
| 2020/0228017 A1* | 7/2020 | Hu | H02M 3/1584 |
| 2020/0287469 A1* | 9/2020 | Cho | H02M 3/33538 |
| 2021/0083575 A1* | 3/2021 | Jin | H02M 1/08 |
| 2021/0083584 A1* | 3/2021 | Jin | H02M 3/1584 |
| 2021/0083658 A1* | 3/2021 | Jin | H02M 3/155 |
| 2021/0336547 A1* | 10/2021 | Hirokawa | H02M 1/0095 |
| 2022/0014086 A1* | 1/2022 | Ye | H02M 3/158 |
| 2022/0021312 A1* | 1/2022 | Hirokawa | H02M 3/33571 |

* cited by examiner

[FIG. 2]
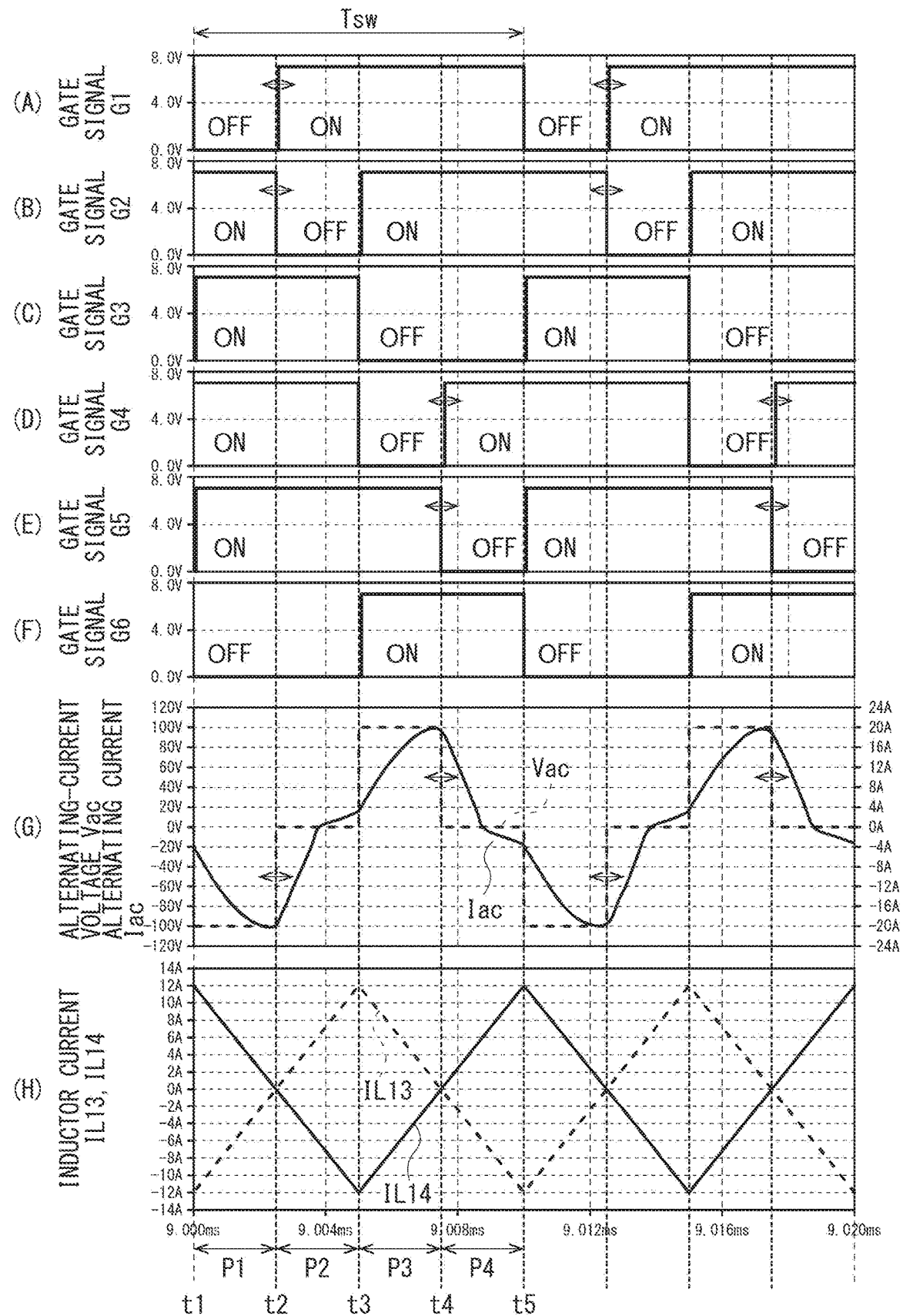

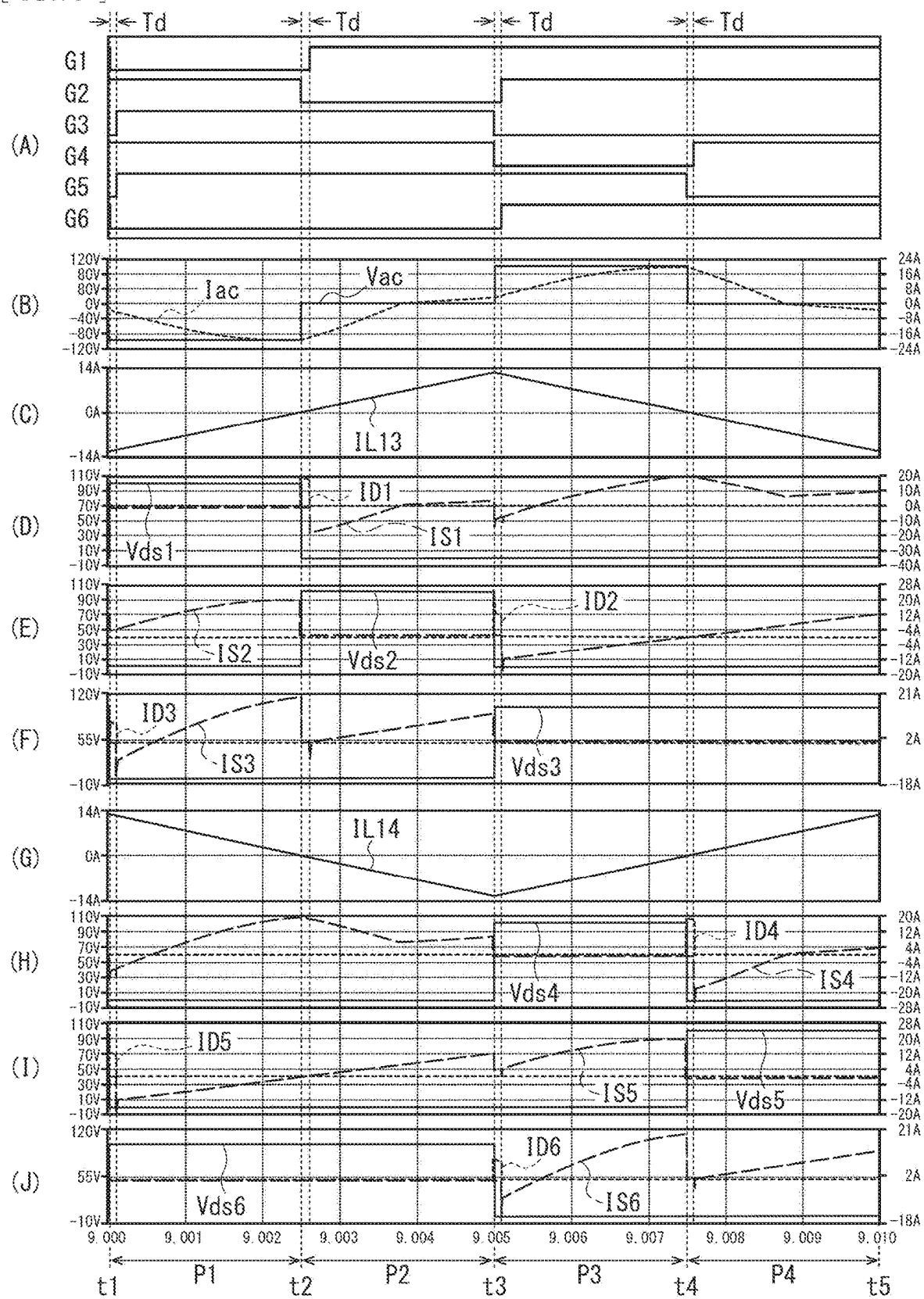
[FIG. 3]

[ FIG. 4A ]
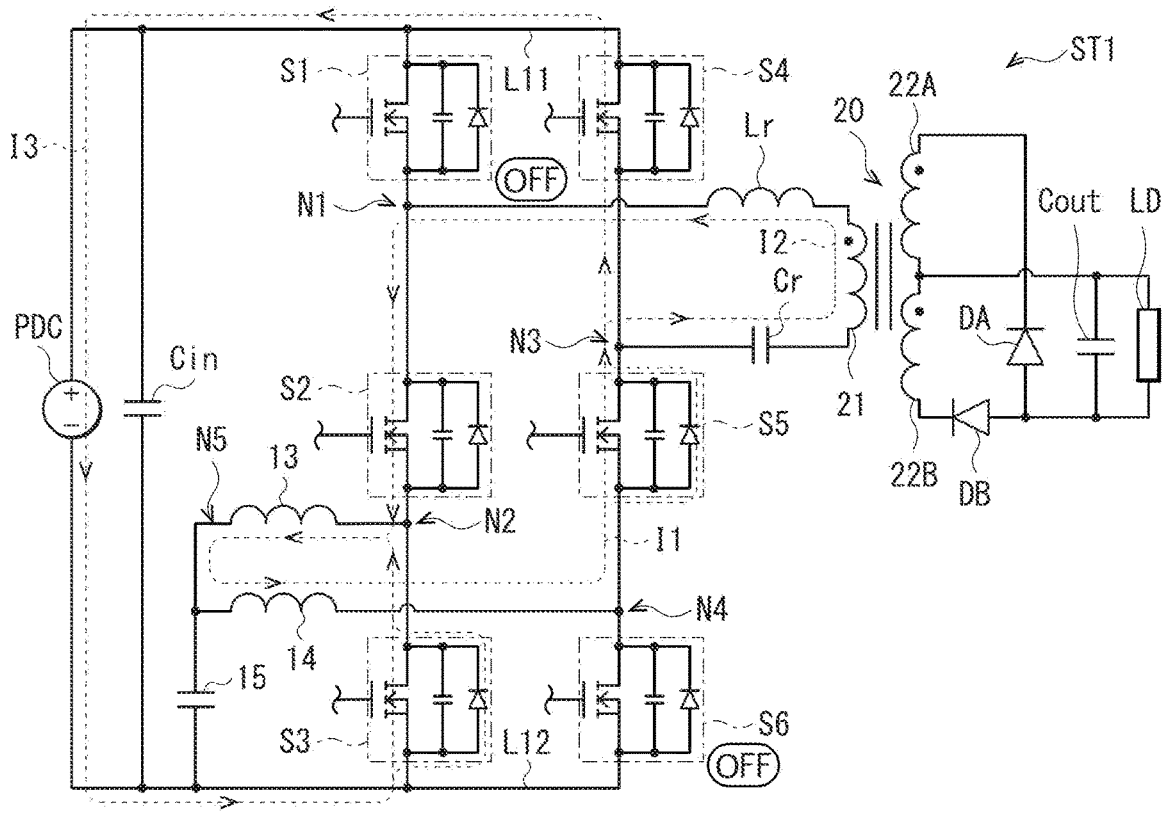
[ FIG. 4B ]
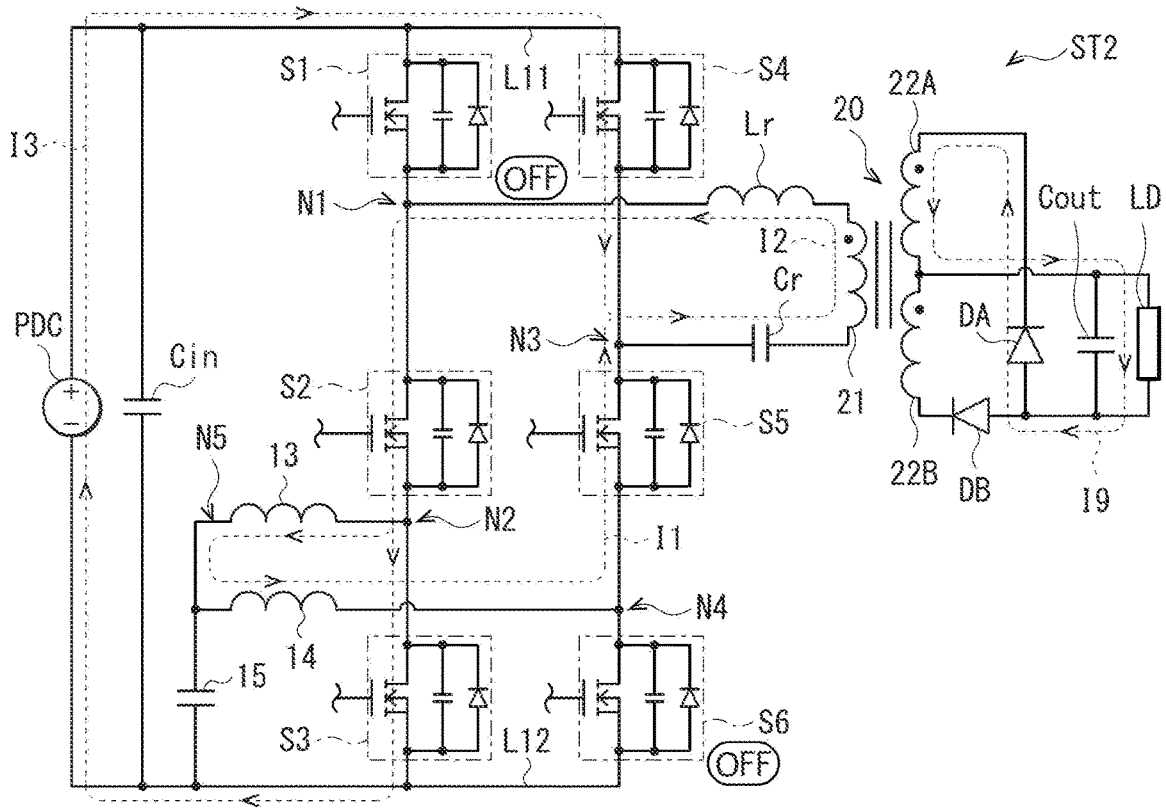

[FIG. 4C]
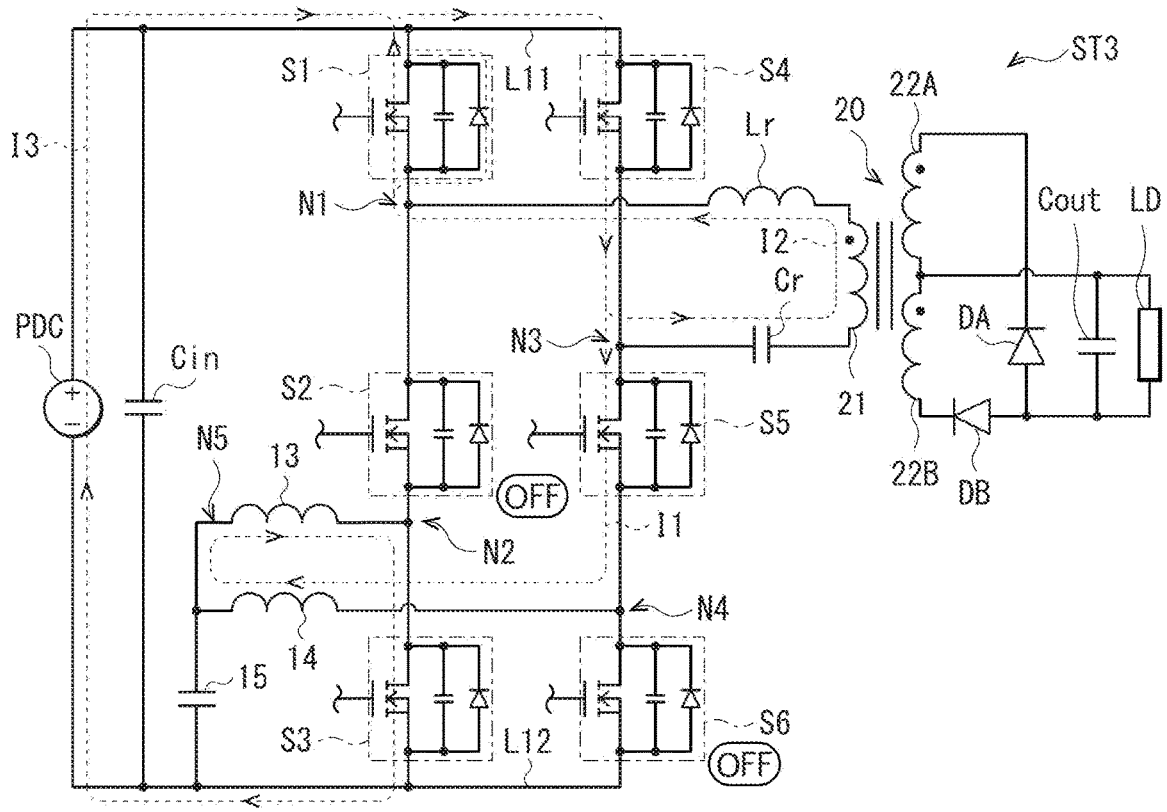
[FIG. 4D]
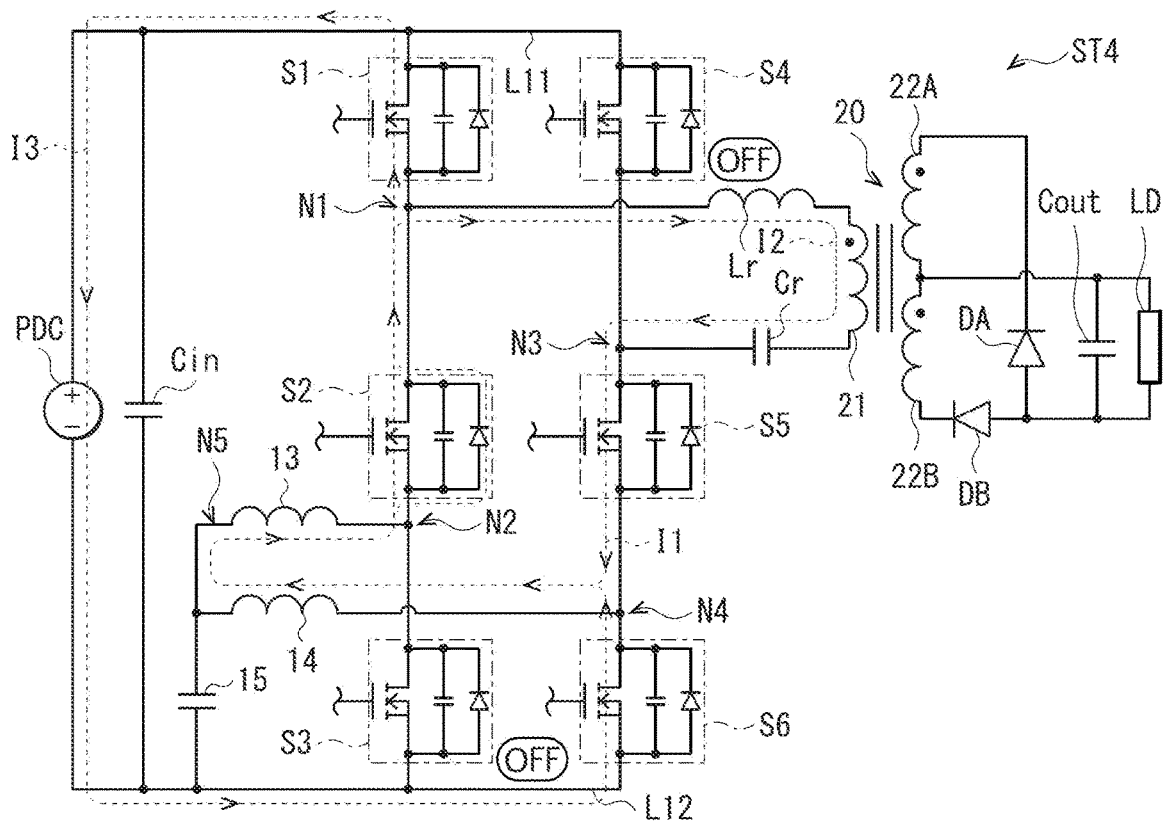

[FIG. 4E]
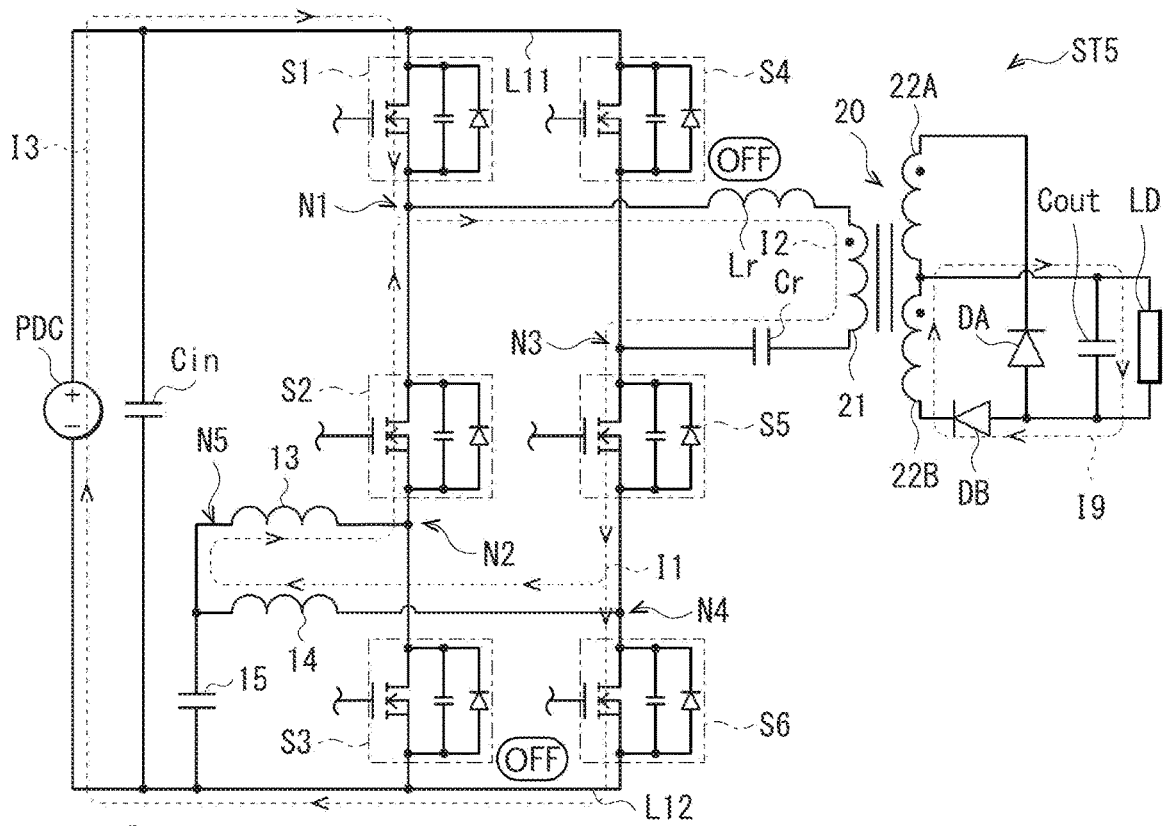
[FIG. 4F]
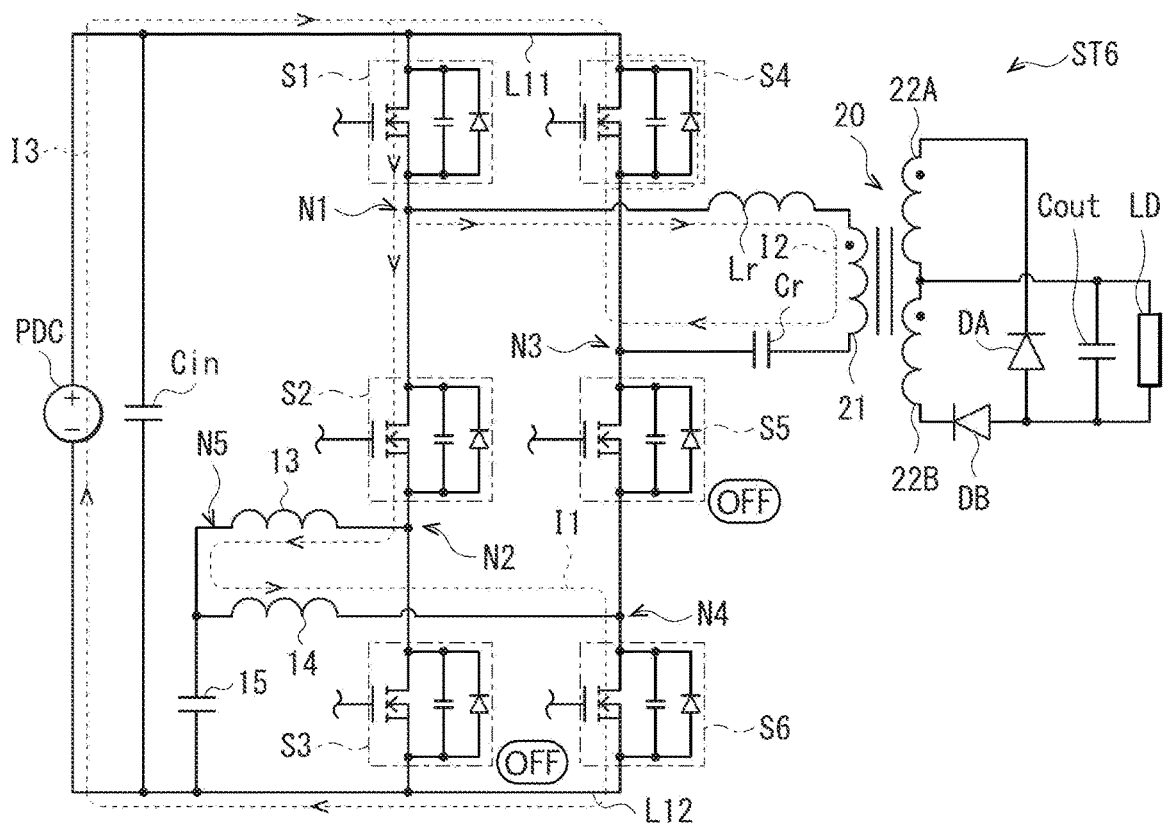

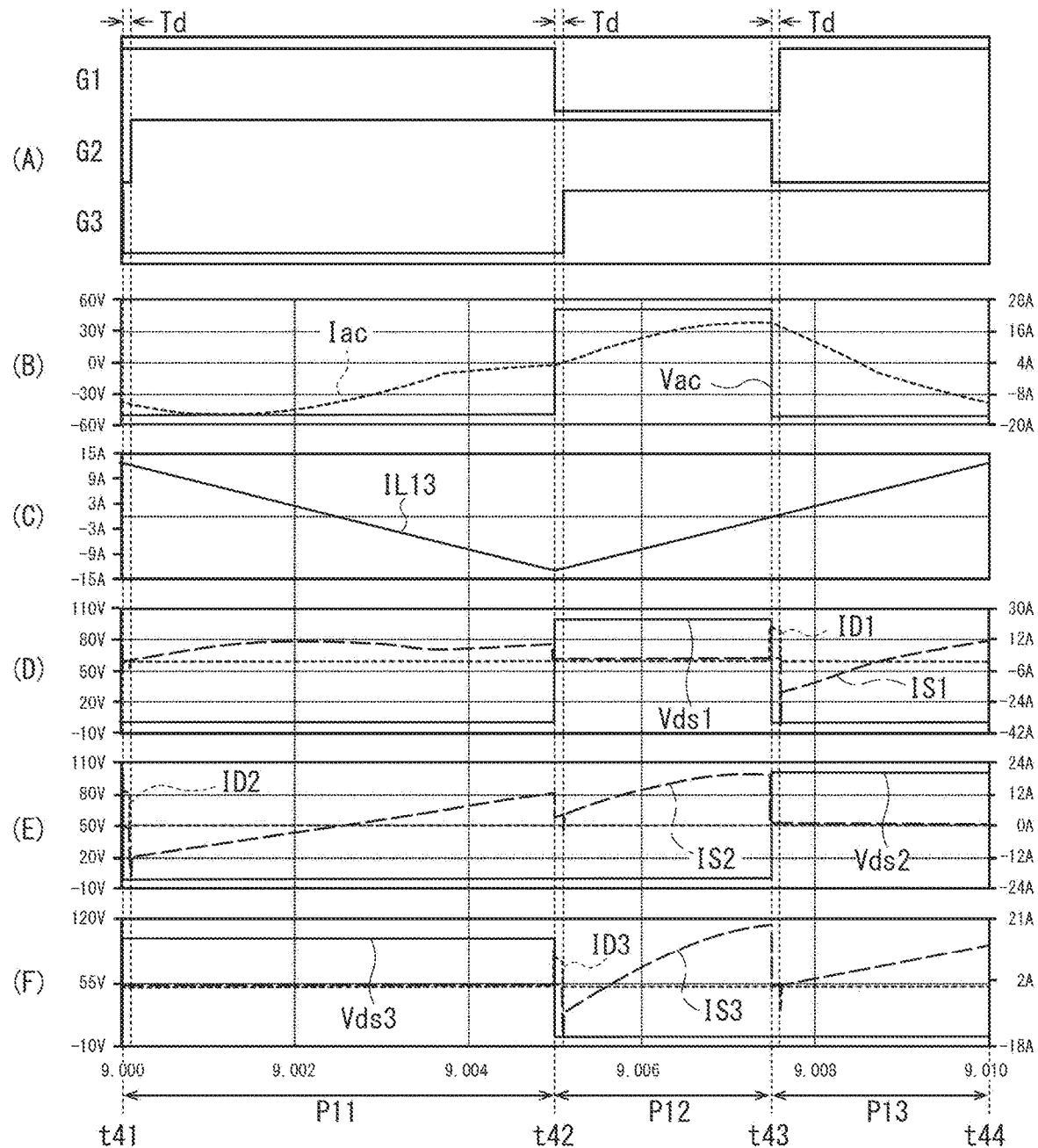
[FIG. 12]

[ FIG. 13A ]
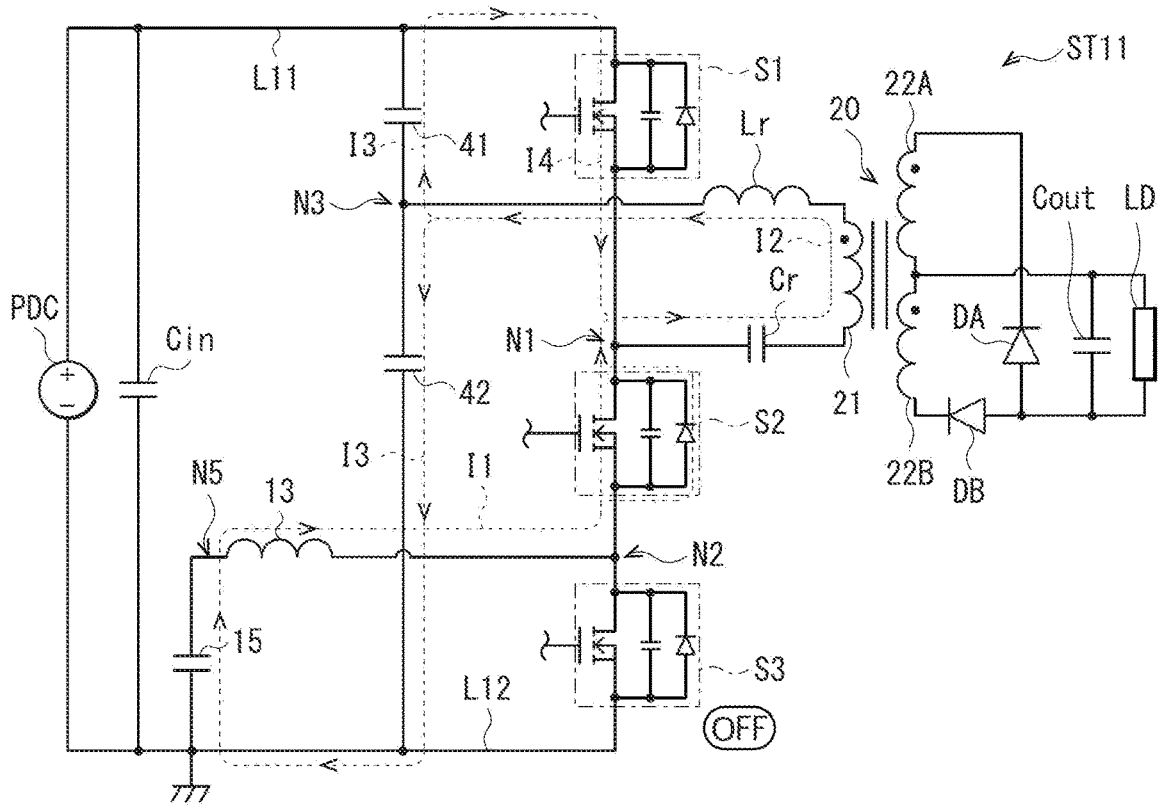
[ FIG. 13B ]
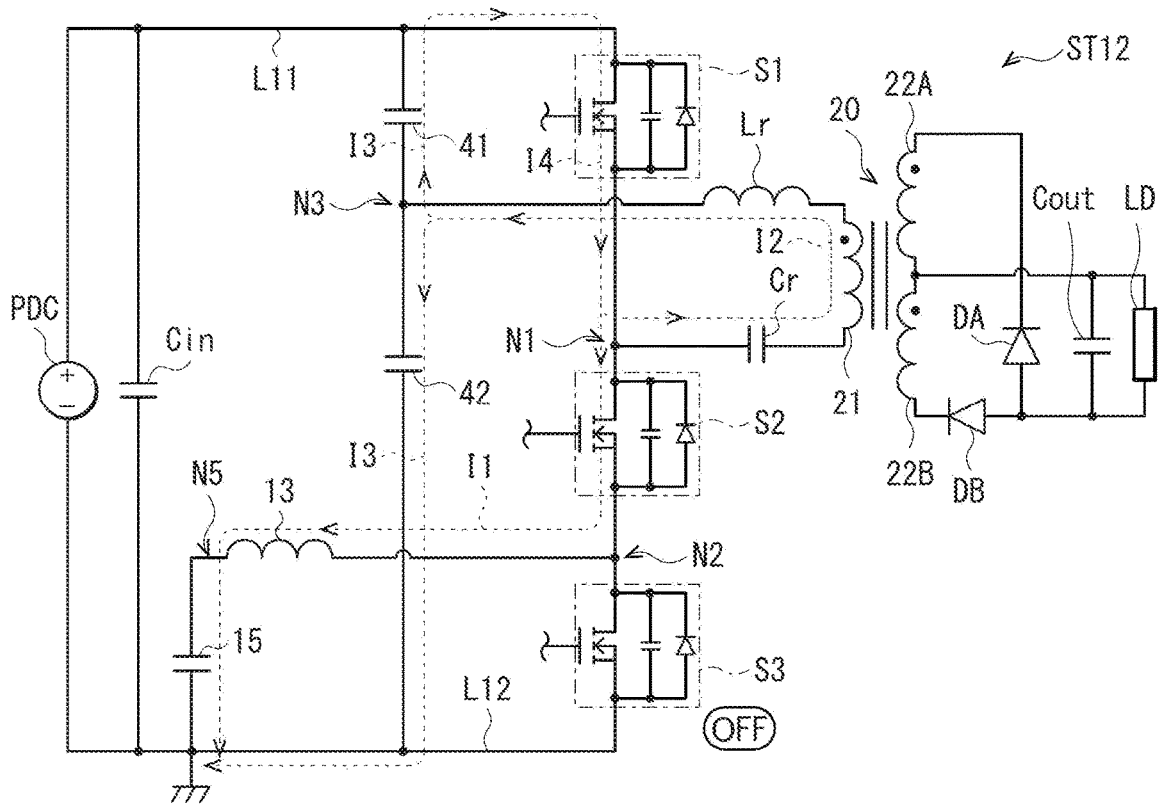

[ FIG. 13C ]
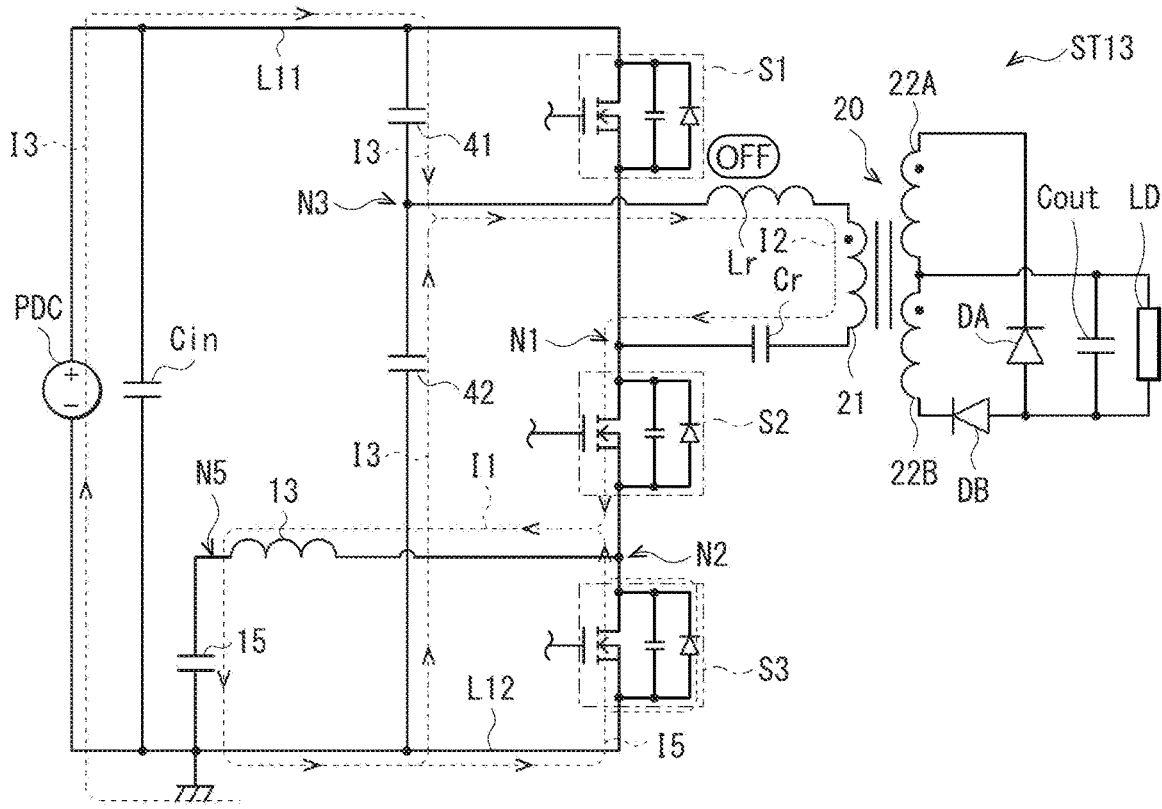
[ FIG. 13D ]
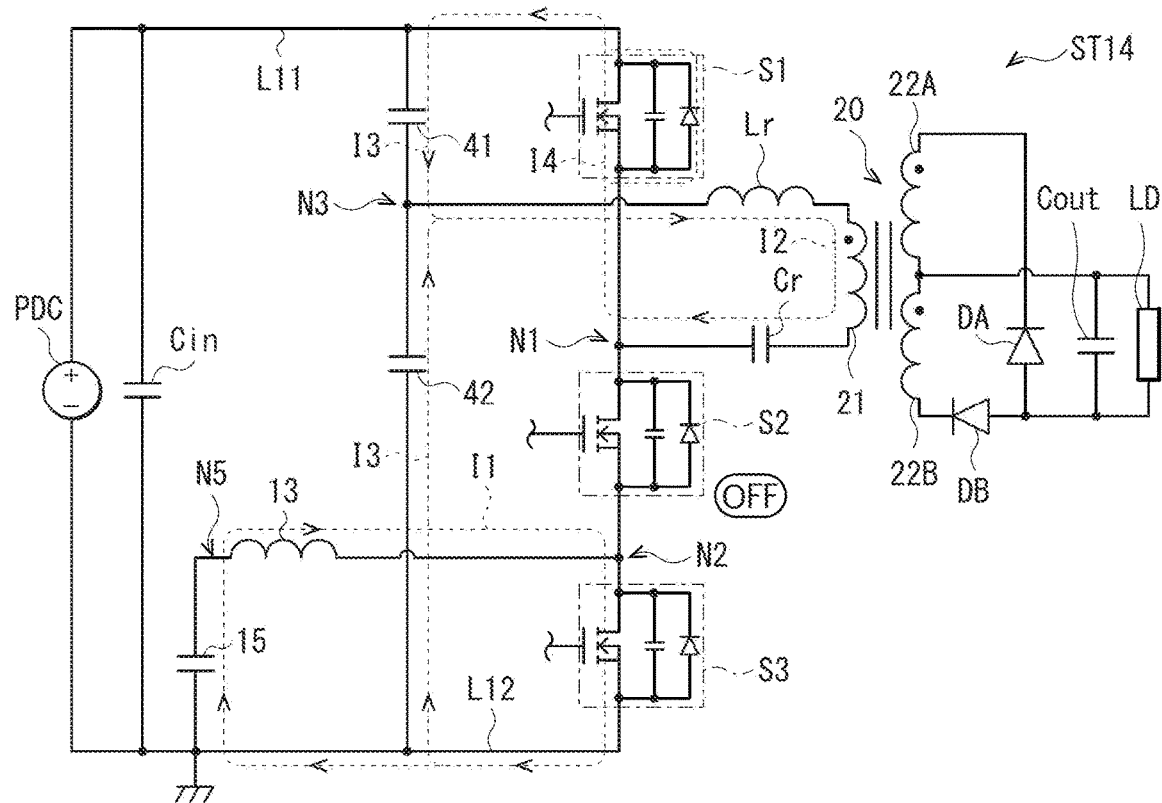

POWER CONVERSION APPARATUS AND POWER CONVERSION SYSTEM

TECHNICAL FIELD

The disclosure relates to a power conversion apparatus and a power conversion system that each convert electric power.

BACKGROUND ART

A power conversion apparatus converts electric power by stepping up or stepping down an input voltage. Patent Literature 1 discloses a power conversion apparatus including a transformer and an arm. The arm is provided on a primary side of the transformer and includes three transistors. The power conversion apparatus steps up an inputted voltage and transforms the stepped-up voltage.

CITATION LIST

Patent Literature

Patent Literature 1: Japanese Unexamined Patent Application Publication No. 2019-187021

SUMMARY

A power conversion apparatus according to an embodiment of the disclosure includes a first power terminal, a first arm, a second arm, a first inductor, a second inductor, a first capacitor, a first transformer, a rectifying circuit, a second power terminal, and a control circuit. The first power terminal includes a first coupling terminal and a second coupling terminal. The first arm is provided on a first path coupling the first coupling terminal and the second coupling terminal to each other, and includes a first switching device provided between the first coupling terminal and a first node, a second switching device provided between the first node and a second node, and a third switching device provided between the second node and the second coupling terminal. The second arm is provided on a second path coupling the first coupling terminal and the second coupling terminal to each other, and includes a fourth switching device provided between the first coupling terminal and a third node, a fifth switching device provided between the third node and a fourth node, and a sixth switching device provided between the fourth node and the second coupling terminal. The first inductor is provided between the second node and a fifth node. The second inductor is provided between the fourth node and the fifth node. The first capacitor is provided between the fifth node and the second coupling terminal. The first transformer includes a first winding and a second winding, the first winding being provided on a path coupling the first node and the third node to each other. The rectifying circuit includes multiple rectifying devices coupled to the second winding. The second power terminal is coupled to the rectifying circuit and includes a third coupling terminal and a fourth coupling terminal. The control circuit is configured to control switching operations of the first arm and the second arm on the basis of a voltage at the second power terminal.

A power conversion system according to an embodiment of the disclosure includes a power conversion apparatus and a direct-current power supply apparatus. The power conversion apparatus includes a first power terminal, a first arm, a second arm, a first inductor, a second inductor, a first capacitor, a first transformer, a rectifying circuit, a second power terminal, and a control circuit. The first power terminal includes a first coupling terminal and a second coupling terminal. The first arm is provided on a first path coupling the first coupling terminal and the second coupling terminal to each other, and includes a first switching device provided between the first coupling terminal and a first node, a second switching device provided between the first node and a second node, and a third switching device provided between the second node and the second coupling terminal. The second arm is provided on a second path coupling the first coupling terminal and the second coupling terminal to each other, and includes a fourth switching device provided between the first coupling terminal and a third node, a fifth switching device provided between the third node and a fourth node, and a sixth switching device provided between the fourth node and the second coupling terminal. The first inductor is provided between the second node and a fifth node. The second inductor is provided between the fourth node and the fifth node. The first capacitor is provided between the fifth node and the second coupling terminal. The first transformer includes a first winding and a second winding, the first winding being provided on a path coupling the first node and the third node to each other. The rectifying circuit includes multiple rectifying devices coupled to the second winding. The second power terminal is coupled to the rectifying circuit and includes a third coupling terminal and a fourth coupling terminal. The control circuit is configured to control switching operations of the first arm and the second arm on the basis of a voltage at the second power terminal. The direct-current power supply apparatus is coupled to the first power terminal of the power conversion apparatus.

A power conversion apparatus according to an embodiment of the disclosure includes a first power terminal, an arm, an inductor, a first capacitor, a second capacitor, a third capacitor, a transformer, a rectifying circuit, a second power terminal, and a control circuit. The first power terminal includes a first coupling terminal and a second coupling terminal. The arm is provided on a path coupling the first coupling terminal and the second coupling terminal to each other, and includes a first switching device provided between the first coupling terminal and a first node, a second switching device provided between the first node and a second node, and a third switching device provided between the second node and the second coupling terminal. The inductor is provided between the second node and a third node. The first capacitor is provided between the third node and the second coupling terminal. The second capacitor is provided between the first coupling terminal and a fourth node. The third capacitor is provided between the fourth node and the second coupling terminal. The transformer includes a first winding and a second winding, the first winding being provided on a path coupling the first node and the fourth node to each other. The rectifying circuit includes multiple rectifying devices coupled to the second winding. The second power terminal is coupled to the rectifying circuit and includes a third coupling terminal and a fourth coupling terminal. The control circuit is configured to control a switching operation of the arm on the basis of a voltage at the second power terminal.

A power conversion system according to an embodiment of the disclosure includes a power conversion apparatus and a direct-current power supply apparatus. The power conversion apparatus includes a first power terminal, an arm, an inductor, a first capacitor, a second capacitor, a third capacitor, a transformer, a rectifying circuit, a second power terminal, and a control circuit. The first power terminal includes a first coupling terminal and a second coupling terminal. The arm is provided on a path coupling the first coupling terminal and the second coupling terminal to each other, and includes a first switching device provided between the first coupling terminal and a first node, a second switching device provided between the first node and a second node, and a third switching device provided between the second node and the second coupling terminal. The inductor is provided between the second node and a third node. The first capacitor is provided between the third node and the second coupling terminal. The second capacitor is provided between the first coupling terminal and a fourth node. The third capacitor is provided between the fourth node and the second coupling terminal. The transformer includes a first winding and a second winding, the first winding being provided on a path coupling the first node and the fourth node to each other. The rectifying circuit includes multiple rectifying devices coupled to the second winding. The second power terminal is coupled to the rectifying circuit and includes a third coupling terminal and a fourth coupling terminal. The control circuit is configured to control a switching operation of the arm on the basis of a voltage at the second power terminal. The direct-current power supply apparatus is coupled to the first power terminal of the power conversion apparatus.

BRIEF DESCRIPTION OF THE DRAWINGS

FIG. 2 is a timing waveform diagram illustrating an operation example of the power conversion system illustrated in FIG. 1.

FIG. 3 is another timing waveform diagram illustrating an operation example of the power conversion system illustrated in FIG. 1.

FIG. 4A is an explanatory diagram illustrating an operation state of the power conversion system illustrated in FIG. 1.

FIG. 4B is an explanatory diagram illustrating another operation state of the power conversion system illustrated in FIG. 1.

FIG. 4C is an explanatory diagram illustrating another operation state of the power conversion system illustrated in FIG. 1.

FIG. 4D is an explanatory diagram illustrating another operation state of the power conversion system illustrated in FIG. 1.

FIG. 4E is an explanatory diagram illustrating another operation state of the power conversion system illustrated in FIG. 1.

FIG. 4F is an explanatory diagram illustrating another operation state of the power conversion system illustrated in FIG. 1.

FIG. 12 is a timing waveform diagram illustrating an operation example of the power conversion system illustrated in FIG. 11.

FIG. 13A is an explanatory diagram illustrating an operation state of the power conversion system illustrated in FIG. 11.

FIG. 13B is an explanatory diagram illustrating another operation state of the power conversion system illustrated in FIG. 11.

FIG. 13C is an explanatory diagram illustrating another operation state of the power conversion system illustrated in FIG. 11.

FIG. 13D is an explanatory diagram illustrating another operation state of the power conversion system illustrated in FIG. 11.

DETAILED DESCRIPTION

It is desired that a power conversion apparatus be operable based on various input voltages, and a wide input voltage range is thus expected to be achieved by the power conversion apparatus.

It is desirable to provide a power conversion apparatus and a power conversion system that each make it possible to widen an input voltage range.

A description is given in detail below of embodiments of the disclosure with reference to the drawings. The description is given in the following order.

1. First Embodiment
2. Second Embodiment
1. First Embodiment

Configuration Example

Figure 1:
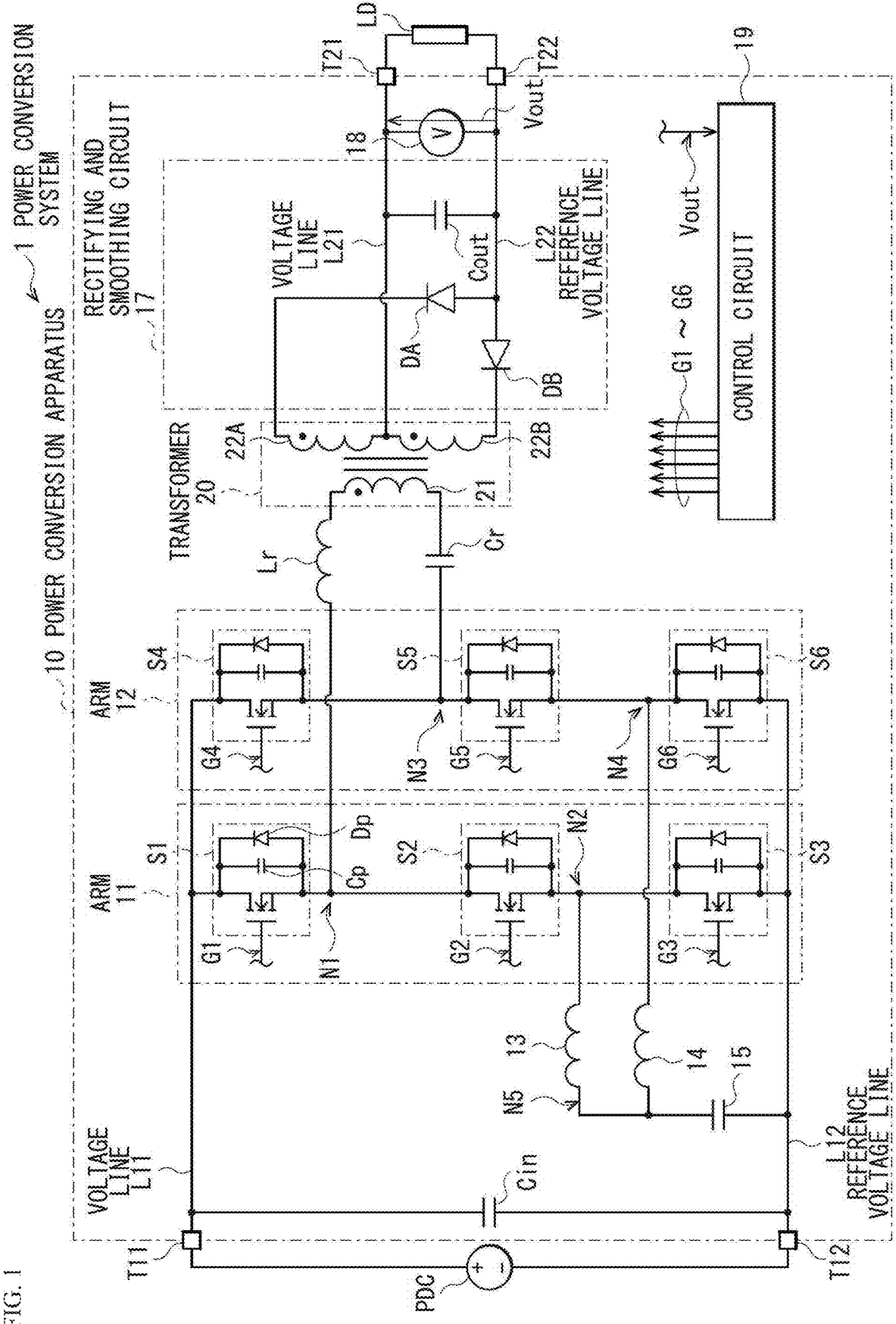
FIG. 1 is a circuit diagram illustrating a configuration example of a power conversion system according to one example embodiment of the disclosure.

FIG. 1 illustrates a configuration example of a power conversion system 1 including a power conversion apparatus according to an embodiment of the disclosure. The power conversion system 1 includes a direct-current power supply apparatus PDC, the power conversion apparatus 10, and a load apparatus LD. The power conversion system 1 is configured to convert electric power by stepping down a voltage supplied from the direct-current power supply apparatus PDC and to supply the converted electric power to the load apparatus LD.

The direct-current power supply apparatus PDC is configured to supply direct-current electric power to the power conversion apparatus 10. The direct-current power supply apparatus PDC may be a battery, for example. Alternatively, the direct-current power supply apparatus PDC may include a battery and a DC-to-DC converter, and the DC-to-DC converter may convert direct-current electric power supplied from the battery and may supply the converted direct-current electric power to the power conversion apparatus 10.

The power conversion apparatus 10 is configured to convert electric power by stepping down a voltage (an input voltage) supplied from the direct-current power supply apparatus PDC and to supply the converted electric power to the load apparatus LD. The power conversion apparatus 10 is an interleave circuit with two arms. The power conversion apparatus 10 includes input terminals T11 and T12, an input capacitor Cin, arms 11 and 12, inductors 13 and 14, a capacitor 15, a resonant inductor Lr, a resonant capacitor Cr, a transformer 20, a rectifying and smoothing circuit 17, a voltage sensor 18, a control circuit 19, and output terminals T21 and T22. Primary-side circuitry of the power conversion system 1 include the direct-current power supply apparatus PDC, the input capacitor Cin, the arms 11 and 12, the inductors 13 and 14, the capacitor 15, the resonant inductor Lr, and the resonant capacitor Cr. Secondary-side circuitry of the power conversion system 1 include the rectifying and smoothing circuit 17 and the load apparatus LD.

The input terminals T11 and T12 are configured to be supplied with electric power from the direct-current power supply apparatus PDC. In the power conversion apparatus 10, the input terminal T11 is coupled to a voltage line L11, and the input terminal T12 is coupled to a reference voltage line L12.

One end of the input capacitor Cin is coupled to the voltage line L11, and another end of the input capacitor Cin is coupled to the reference voltage line L12.

The arm 11 is provided on a path coupling the voltage line L11 and the reference voltage line L12 to each other. The arm 11 includes three transistors S1 to S3. The arm 12 is provided on a path that couples the voltage line L11 and the reference voltage line L12 to each other and is different from the path on which the arm 11 is provided. The arm 12 includes three transistors S4 to S6. The transistors S1 to S6 are switching devices that perform respective switching operations on the basis of gate signals G1 to G6. The transistors S1 to S6 are each configured by an N-type field-effect transistor (FET), for example. The transistors S1 to S6 each include a parasitic diode Dp. For example, in the transistor S1, an anode of the parasitic diode Dp is coupled to a source of the transistor S1, and a cathode of the parasitic diode Dp is coupled to a drain of the transistor S1. In the drawing, a capacitor Cp representing a parasitic capacitance of the transistor S1 is also illustrated. The same applies to the transistors S2 to S6. Although the N-type field-effect transistors are used in this example, any kind of switching devices may be used.

The transistor S1 is provided between the voltage line L11 and a node N1, and is configured to couple the node N1 to the voltage line L11 by being turned on. The drain of the transistor S1 is coupled to the voltage line L11, a gate of the transistor S1 is supplied with the gate signal G1, and the source of the transistor S1 is coupled to the node N1. The transistor S2 is provided between the node N1 and a node N2, and is configured to couple the node N1 to the node N2 by being turned on. A drain of the transistor S2 is coupled to the node N1, a gate of the transistor S2 is supplied with the gate signal G2, and a source of the transistor S2 is coupled to the node N2. The transistor S3 is provided between the node N2 and the reference voltage line L12, and is configured to couple the node N2 to the reference voltage line L12 by being turned on. A drain of the transistor S3 is coupled to the node N2, a gate of the transistor S3 is supplied with the gate signal G3, and a source of the transistor S3 is coupled to the reference voltage line L12. The node N1 is a coupling point between the source of the transistor S1 and the drain of the transistor S2. The node N2 is a coupling point between the source of the transistor S2 and the drain of the transistor S3.

The transistor S4 is provided between the voltage line L11 and a node N3, and is configured to couple the node N3 to the voltage line L1 by being turned on. A drain of the transistor S4 is coupled to the voltage line L11, a gate of the transistor S4 is supplied with the gate signal G4, and a source of the transistor S4 is coupled to the node N3. The transistor S5 is provided between the node N3 and a node N4, and is configured to couple the node N3 to the node N4 by being turned on. A drain of the transistor S5 is coupled to the node N3, a gate of the transistor S5 is supplied with the gate signal G5, and a source of the transistor S5 is coupled to the node N4. The transistor S6 is provided between the node N4 and the reference voltage line L12, and is configured to couple the node N4 to the reference voltage line L12 by being turned on. A drain of the transistor S6 is coupled to the node N4, a gate of the transistor S6 is supplied with the gate signal G6, and a source of the transistor S6 is coupled to the reference voltage line L12. The node N3 is a coupling point between the source of the transistor S4 and the drain of the transistor S5. The node N4 is a coupling point between the source of the transistor S5 and the drain of the transistor S6.

One end of the inductor 13 is coupled to the node N2 of the arm 11, and another end of the inductor 13 is coupled to the node N5. One end of the inductor 14 is coupled to the node N4 of the arm 12, and another end of the inductor 14 is coupled to the node N5. One end of the capacitor 15 is coupled to the node N5, and another end of the capacitor 15 is coupled to the reference voltage line L12.

One end of the resonant inductor Lr is coupled to the node N1 of the arm 11, and another end of the resonant inductor Lr is coupled to one end of a winding 21 (described later) of the transformer 20. One end of the resonant capacitor Cr is coupled to the node N3 of the arm 12, and another end of the resonant capacitor Cr is coupled to another end of the winding 21 (described later) of the transformer 20.

The transformer 20 is configured to provide direct-current isolation and alternating-current coupling between the primary-side circuitry and the secondary-side circuitry, to transform an alternating-current voltage supplied from the primary-side circuitry with a transformation ratio N of the transformer 20, and to supply the transformed alternating-current voltage to the secondary-side circuitry. The transformer 20 includes the winding 21 and windings 22A and 22B. The one end of the winding 21 is coupled to the other end of the resonant inductor Lr, and the other end of the winding 21 is coupled to the other end of the resonant capacitor Cr. One end of the winding 22A is coupled to a cathode of a diode DA (described later) of the rectifying and smoothing circuit 17, and another end of the winding 22A is coupled to a voltage line L21. One end of the winding 22B is coupled to the voltage line L21, and another end of the winding 22B is coupled to a cathode of a diode DB (described later) of the rectifying and smoothing circuit 17.

The rectifying and smoothing circuit 17 is configured to generate a direct-current voltage by rectifying an alternating-current voltage outputted from the windings 22A and 22B of the transformer 20. The rectifying and smoothing circuit 17 includes the diodes DA and DB and a capacitor Cout. An anode of the diode DA is coupled to a reference voltage line L22, and the cathode of the diode DA is coupled to the one end of the winding 22A of the transformer 20. An anode of the diode DB is coupled to the reference voltage line L22, and the cathode of the diode DB is coupled to the other end of the winding 22B of the transformer 20. One end of the capacitor Cout is coupled to the voltage line L21, and another end of the capacitor Cout is coupled to the reference voltage line L22.

The voltage sensor 18 is configured to detect a voltage at the voltage line L21. One end of the voltage sensor 18 is coupled to the voltage line L21, and another end of the voltage sensor 18 is coupled to the reference voltage line L22. The voltage sensor 18 detects, as an output voltage Vout, the voltage at the voltage line L21 based on a voltage at the reference voltage line L22. In addition, the voltage sensor 18 supplies a result of detection of the output voltage Vout to the control circuit 19.

The control circuit 19 is configured to control an operation of the power conversion apparatus 10 by controlling operations of the arms 11 and 12 on the basis of the output voltage Vout detected by the voltage sensor 18. Specifically, the control circuit 19 controls the operation of the power conversion apparatus 10 by generating the gate signals G1 to G6 on the basis of the output voltage Vout and performing pulse width modulation (PWM) control with use of the gate signals G1 to G6. Note that in this example, the control circuit 19 controls the operations of the arms 11 and 12 on the basis of the output voltage Vout detected by the voltage sensor 18; however, this is non-limiting. Alternatively, for example, the control circuit 19 may estimate the output voltage Vout and control the operations of the arms 11 and 12 on the basis of the estimated output voltage Vout. Specifically, the control circuit 19 is able to estimate the output voltage Vout on the basis of, for example, a voltage across the winding 21 of the transformer 20 and a duty ratio of electric power transfer from the primary-side circuitry to the secondary-side circuitry, i.e., a duty ratio of an alternating-current voltage Vac to be described later. In addition, the control circuit 19 is able to estimate the output voltage Vout on the basis of, for example, switching frequencies of the arms 11 and 12, an inductance of the resonant inductor Lr and a capacitance of the resonant capacitor Cr, and a voltage across the resonant inductor Lr. In addition, the control circuit 19 is able to estimate the output voltage Vout on the basis of, for example, the switching frequencies of the arms 11 and 12, the inductance of the resonant inductor Lr and the capacitance of the resonant capacitor Cr, and a voltage across the resonant capacitor Cr.

The output terminals T21 and T22 are configured to supply direct-current electric power generated by the power conversion apparatus 10 to the load apparatus LD. In the power conversion apparatus 10, the output terminal T21 is coupled to the voltage line L21, and the output terminal T22 is coupled to the reference voltage line L22.

The load apparatus LD is a load of the power conversion apparatus 10. The load apparatus LD may be a constant-current load.

With this configuration, the power conversion system 1 converts electric power by stepping down a voltage supplied from the direct-current power supply apparatus PDC and supplies the converted electric power to the load apparatus LD.

The input terminals T11 and T12 correspond to a specific example of a "first power terminal" in one embodiment of the disclosure. The input terminal T11 corresponds to a specific example of a "first coupling terminal" in one embodiment of the disclosure. The input terminal T12 corresponds to a specific example of a "second coupling terminal" in one embodiment of the disclosure. The arm 11 corresponds to a specific example of a "first arm" in one embodiment of the disclosure. The arm 12 corresponds to a specific example of a "second arm" in one embodiment of the disclosure. The transistor S1 corresponds to a specific example of a "first switching device" in one embodiment of the disclosure. The transistor S2 corresponds to a specific example of a "second switching device" in one embodiment of the disclosure. The transistor S3 corresponds to a specific example of a "third switching device" in one embodiment of the disclosure. The node N1 corresponds to a specific example of a "first node" in one embodiment of the disclosure. The node N2 corresponds to a specific example of a "second node" in one embodiment of the disclosure. The transistor S4 corresponds to a specific example of a "fourth switching device" in one embodiment of the disclosure. The transistor S5 corresponds to a specific example of a "fifth switching device" in one embodiment of the disclosure. The transistor S6 corresponds to a specific example of a "sixth switching device" in one embodiment of the disclosure. The node N3 corresponds to a specific example of a "third node" in one embodiment of the disclosure. The node N4 corresponds to a specific example of a "fourth node" in one embodiment of the disclosure. The inductor 13 corresponds to a specific example of a "first inductor" in one embodiment of the disclosure. The inductor 14 corresponds to a specific example of a "second inductor" in one embodiment of the disclosure. The capacitor 15 corresponds to a specific example of a "first capacitor" in one embodiment of the disclosure. The node N5 corresponds to a specific example of a "fifth node" in one embodiment of the disclosure. The transformer 20 corresponds to a specific example of a "first transformer" in one embodiment of the disclosure. The winding 21 corresponds to a specific example of a "first winding" in one embodiment of the disclosure. The windings 22A and 22B correspond to a specific example of a "second winding" in one embodiment of the disclosure. The rectifying and smoothing circuit 17 corresponds to a specific example of a "rectifying circuit" in one embodiment of the disclosure. The diodes DA and DB correspond to a specific example of "multiple rectifying devices" in one embodiment of the disclosure. The output terminals T21 and T22 correspond to a specific example of a "second power terminal" in one embodiment of the disclosure. The output terminal T21 corresponds to a specific example of a "third coupling terminal" in one embodiment of the disclosure. The output terminal T22 corresponds to a specific example of a "fourth coupling terminal" in one embodiment of the disclosure. The control circuit 19 corresponds to a specific example of a "control circuit" in one embodiment of the disclosure. The direct-current power supply apparatus PDC corresponds to a specific example of a "direct-current power supply apparatus" in one embodiment of the disclosure. The resonant inductor Lr corresponds to a specific example of a "resonant inductor" in one embodiment of the disclosure. The resonant capacitor Cr corresponds to a specific example of a "resonant capacitor" in one embodiment of the disclosure.

[Operations and Workings]

Next, a description will be given of operations and workings of the power conversion system 1 of the present embodiment.

(Outline of Overall Operation)

First, an outline of an overall operation of the power conversion system 1 will be described with reference to FIGS. 1 and 2. The transistors S1 to S6 of the arms 11 and 12 perform respective switching operations on the basis of the gate signals G1 to G6. The transformer 20 transforms an alternating-current voltage supplied from the primary-side circuitry with the transformation ratio N of the transformer 20, and supplies the transformed alternating-current voltage to the secondary-side circuitry. The rectifying and smoothing circuit 17 performs rectifying and smoothing operation on the basis of the alternating-current voltage supplied from the transformer 20. The voltage sensor 18 detects, as the output voltage Vout, the voltage at the voltage line L21 relative the voltage at the reference voltage line L22. The control circuit 19 controls the operation of the power conversion apparatus 10 by controlling the operations of the arms 11 and 12 on the basis of the output voltage Vout detected by the voltage sensor 18. In this way, the power conversion system 1 converts electric power by stepping down the voltage supplied from the direct-current power supply apparatus PDC, and supplies the converted electric power to the load apparatus LD.

(Detailed Operation)

FIG. 2 illustrates an operation example of the power conversion system 1. Parts (A) to (F) of FIG. 2 illustrate waveforms of the gate signals G1 to G6, respectively. Part (G) of FIG. 2 illustrates a waveform of a voltage (the alternating-current voltage Vac) at the node N1 based on a voltage at the node N3, and a waveform of a current (an alternating current Iac) flowing from the one end (on the node N1 side) to the other end (on the node N3 side) of the winding 21 of the transformer 20. Part (H) of FIG. 2 illustrates a waveform of a current (an inductor current IL13) flowing through the inductor 13 from the node N5 toward the node N2, and a waveform of a current (an inductor current IL14) flowing through the inductor 14 from the node N5 toward the node N4. In parts (A) to (F) of FIG. 2, "ON" and "OFF" respectively indicate an on-state and an off-state of the transistors S1 to S6 to be supplied with the gate signals G1 to G6. In this example, the direct-current power supply apparatus PDC supplies a direct-current voltage of 100 V to the power conversion apparatus 10.

The power conversion system 1 operates by repeating operations to be performed during a period from a timing t1 to a timing t5. A length of the period from the timing t1 to the timing t5 corresponds to a switching period Tsw. The period from the timing t1 to the timing t5 includes a period P1 from the timing t1 to a timing t2, a period P2 from the timing t2 to a timing t3, a period P3 from the timing t3 to a timing t4, and a period P4 from the timing t4 to the timing t5.

The control circuit 19 controls the operation of the power conversion apparatus 10 by generating the gate signals G1 to G6 on the basis of the output voltage Vout and performing PWM control with use of the gate signals G1 to G6.

At the timing t1, the control circuit 19 changes the gate signals G1 and G6 from a high level to a low level (parts (A) and (F) of FIG. 2). Further, at a timing at which a dead time Td (not illustrated) has elapsed from the timing t1, the control circuit 19 changes the gate signals G3 and G5 from the low level to the high level (parts (C) and (E) of FIG. 2). As a result, the transistors S2 to S5 are on, and the transistors S1 and S6 are off.

At the timing t2, the control circuit 19 changes the gate signal G2 from the high level to the low level (part (B) of FIG. 2). Further, at a timing at which the dead time Td (not illustrated) has elapsed from the timing t2, the control circuit 19 changes the gate signal G1 from the low level to the high level (part (A) of FIG. 2). As a result, the transistors S1 and S3 to S5 are on, and the transistors S2 and S6 are off.

At the timing t3, the control circuit 19 changes the gate signals G3 and G4 from the high level to the low level (parts (C) and (D) of FIG. 2). Further, at a timing at which the dead time Td (not illustrated) has elapsed from the timing t3, the control circuit 19 changes the gate signals G2 and G6 from the low level to the high level (parts (B) and (F) of FIG. 2). As a result, the transistors S1, S2, S5, and S6 are on, and the transistors S3 and S4 are off.

At the timing t4, the control circuit 19 changes the gate signal G5 from the high level to the low level (part (E) of FIG. 2). Further, at a timing at which the dead time Td (not illustrated) has elapsed from the timing t4, the control circuit 19 changes the gate signal G4 from the low level to the high level (part (D) of FIG. 2). As a result, the transistors S1, S2, S4, and S6 are on, and the transistors S3 and S5 are off.

The control circuit 19 controls the operations of the transistors S1 to S6 to change on-duty ratios of the transistors S1, S2, S4, and S5 in accordance with the output voltage Vout. Further, the control circuit 19 maintains on-duty ratios of the transistors S3 and S6 at approximately 50%. The on-duty ratio of the transistor S1 is a ratio of time during which the transistor S1 is on to time corresponding to the switching period Tsw. The same applies to the transistors S2 to S6. In this example, because the voltage (input voltage Vin) supplied from the direct-current power supply apparatus PDC is 100V, the voltage at the node N5 is approximately 50 V.

In the power conversion system 1, the inductor currents IL13 and IL14 flow through the inductors 13 and 14 as illustrated in part (H) of FIG. 2, and the alternating-current voltage Vac is generated between the node N1 and the node N3 as illustrated in part (G) of FIG. 2. In this example, the alternating-current voltage Vac is 0 V during the periods P2 and P4, approximately "−100 V" (approximately equal to −Vin) during the period P1, and approximately "100 V" (approximately equal to Vin) during the period P3. Further, the alternating current Iac flows through the winding 21 of the transformer 20 as illustrated in part (G) of FIG. 2. The transformer 20 transforms an alternating-current signal supplied from the primary-side circuitry with the transformation ratio N of the transformer 20, and supplies the transformed alternating-current signal to the secondary-side circuitry. As a result, in the power conversion system 1, a current flows through the secondary-side circuitry, and the rectifying and smoothing circuit 17 performs the rectifying and smoothing operation. In this way, the power conversion system 1 generates a direct-current voltage and supplies the generated direct-current voltage to the load apparatus LD.

In changing the on-duty ratios of the transistors S1, S2, S4, and S5, the control circuit 19 changes transition timings of the gate signals G1 and G2 near the timing t2 as indicated by arrows in parts (A) and (B) of FIG. 2, and changes transition timings of the gate signals G4 and G5 near the timing t4 as indicated by arrows in parts (D) and (E) of FIG. 2. Specifically, the control circuit 19 changes the transition timing at which the gate signal G1 transitions from the low level to the high level near the timing t2 and the transition timing at which the gate signal G2 transitions from the high level to the low level near the timing t2. Further, the control circuit 19 changes the transition timing at which the gate signal G4 transitions from the low level to the high level near the timing t4 and the transition timing at which the gate signal G5 transitions from the high level to the low level near the timing t4. In this way, as indicated by arrows in part (G) of FIG. 2, the power conversion system 1 changes a transition timing of the alternating-current voltage Vac near the timing t2 and a transition timing of the alternating-current voltage Vac near the timing t4, thereby changing the duty ratio of the alternating-current voltage Vac. The duty ratio of the alternating-current voltage Vac is a ratio of time during which the alternating-current voltage Vac is not 0 V to the time corresponding to the switching period Tsw. As a result, electric power to be transferred from the primary-side circuitry to the secondary-side circuitry changes in the power conversion system 1. By changing the transition timings of the transistors S1, S2, S4, and S5 to change the duty ratio of the alternating-current voltage Vac in accordance with the output voltage Vout, the control circuit 19 controls the operation of the power conversion system 1 to allow the output voltage Vout to be constant even in a case where the input voltage Vin varies.

For example, in a case where the voltage (the input voltage Vin) supplied from the direct-current power supply apparatus PDC is constant and where a load current flowing through the load apparatus LD increases, the control circuit 19 prolongs the switching period Tsw and maintains the duty ratio of the alternating-current voltage Vac constant in order to adjust resonance conditions. Specifically, the control circuit 19 increases a length of the period P1 from the timing t1 to the timing t2, a length of the period P2 from the timing t2 to the timing t3, a length of the period P3 from the timing t3 to the timing t4, and a length of the period P4 from the timing t4 to the timing t5 at the same rate as the switching period Tsw. This makes it possible for the power conversion system 1 to maintain the output voltage Vout.

Further, for example, in a case where the load current flowing through the load apparatus LD is to be maintained and where the voltage (the input voltage Vin) supplied from the direct-current power supply apparatus PDC increases, the control circuit 19 maintains the switching period Tsw constant and controls the duty ratio of the alternating-current voltage Vac to be lower by an increase of the input voltage. Specifically, the control circuit 19 reduces the lengths of the periods P1 and P3 and increases the lengths of the periods P2 and P4. This makes it possible for the power conversion system 1 to maintain the output voltage Vout.

A detailed description is given below of the operation of the power conversion system 1 during the period from the timing t1 to the timing t5.

FIG. 3 illustrates a detailed operation of the power conversion system 1. Part (A) of FIG. 3 illustrates the waveforms of the gate signals G1 to G6. Part (B) FIG. 3 illustrates the waveform of the voltage (the alternating-current voltage Vac) at the node N1 based on the voltage at the node N3, and the waveform of the current (the alternating current Iac) flowing from the one end to the other end of the winding 21 of the transformer 20. Part (C) of FIG. 3 illustrates the waveform of the current (the inductor current IL13) flowing through the inductor 13 from the node N5 toward the node N2. Part (D) of FIG. 3 illustrates a waveform of a voltage Vds1 between the drain and the source of the transistor S1, a waveform of a current IS1 flowing from the drain to the source of a body of the transistor S1, and a waveform of a current ID1 flowing through the parasitic diode Dp of the transistor S1. Part (E) of FIG. 3 illustrates a waveform of a voltage Vds2 between the drain and the source of the transistor S2, a waveform of a current IS2 flowing from the drain to the source of a body of the transistor S2, and a waveform of a current ID2 flowing through the parasitic diode Dp of the transistor S2. Part (F) of FIG. 3 illustrates a waveform of a voltage Vds3 between the drain and the source of the transistor S3, a waveform of a current IS3 flowing from the drain to the source of a body of the transistor S3, and a waveform of a current ID3 flowing through the parasitic diode Dp of the transistor S3. Part (G) of FIG. 3 illustrates the waveform of the current (the inductor current IL14) flowing through the inductor 14 from the node N5 toward the node N4. Part (H) of FIG. 3 illustrates a waveform of a voltage Vds4 between the drain and the source of the transistor S4, a waveform of a current IS4 flowing from the drain to the source of a body of the transistor S4, and a waveform of a current ID4 flowing through the parasitic diode Dp of the transistor S4. Part (I) of FIG. 3 illustrates a waveform of a voltage Vds5 between the drain and the source of the transistor S5, a waveform of a current IS5 flowing from the drain to the source of a body of the transistor S5, and a waveform of a current ID5 flowing through the parasitic diode Dp of the transistor S5. Part (J) of FIG. 3 illustrates a waveform of a voltage Vds6 between the drain and the source of the transistor S6, a waveform of a current IS6 flowing from the drain to the source of a body of the transistor S6, and a waveform of a current ID6 flowing through the parasitic diode Dp of the transistor S6.

FIGS. 4A to 4F illustrate operations of the power conversion system 1 in six operation states ST1 to ST6, respectively. For convenience of description, FIGS. 4A to 4F illustrate the power conversion system 1 in a more simplified manner. In the following description, a current flowing through the inductors 13 and 14 will be denoted as a current I1, a current flowing through the winding 21 of the transformer 20 will be denoted as a current I2, a current flowing into or out of the direct-current power supply apparatus PDC will be denoted as a current I3, and a current flowing through the secondary-side circuitry will be denoted as a current I9.

In the period P1 starting from the timing t1, as illustrated in FIG. 2, the transistors S3 and S5 change from the off-state to the on-state, the transistors S1 and S6 change from the on-state to the off-state, and the transistors S2 and S4 remain on. In this period P1, the operation state ST first turns into the operation state ST1 (FIG. 4A), and thereafter turns into the operation state ST2 (FIG. 4B).

In the operation state ST1 (FIG. 4A), in the primary-side circuitry the current I1 flows through the node N2, the inductor 13, the node N5, the inductor 14, the node N4, the transistor S5, and the node N3 in this order. The current I2 flows through the node N3, the resonant capacitor Cr, the winding 21 of the transformer 20, the resonant inductor Lr, the node N1, the transistor S2, and the node N2 in this order. The current I3 flows through the node N3, the transistor S4, the voltage line L11, the direct-current power supply apparatus PDC, the reference voltage line L12, the transistor S3, and the node N2 in this order. Thus, the current I1 flowing through the inductors 13 and 14 is larger in amount than the current I2 flowing through the transformer. Accordingly, the current I3 flows to allow energy to be regenerated in the direct-current power supply apparatus PDC.

In the transistors S3 and S5, the current flows through the parasitic diode Dp during the dead time Td, and after the gate signals G3 and G5 change from the low level to the high level, the current flows through the bodies of the transistors S3 and S5 (parts (A), (F), and (I) of FIG. 3). In this way, the transistors S3 and S5 are each able to change from the off-state to the on-state with the voltage between the drain and the source being low, and are thus each able to achieve what is called soft switching. As a result, it is possible to increase efficiency in the power conversion system 1.

As illustrated in parts (F) and (H) of FIG. 3, the currents IS3 and IS4 gradually decrease in absolute value, and change from negative to positive. This results in a change from the operation state ST1 (FIG. 4A) to the operation state ST2 (FIG. 4B).

In the operation state ST2, in the primary-side circuitry the current I1 flows through the node N2, the inductor 13, the node N5, the inductor 14, the node N4, the transistor S5, and the node N3 in this order. The current I2 flows through the node N3, the resonant capacitor Cr, the winding 21 of the transformer 20, the resonant inductor Lr, the node N1, the transistor S2, and the node N2 in this order. The current I3 flows through the node N2, the transistor S3, the reference voltage line L12, the direct-current power supply apparatus PDC, the voltage line L11, the transistor S4, and the node N3 in this order. That is, after the change from the operation state ST1 to the operation state ST2, the direction of the current I3 becomes opposite to that before the change, and the regeneration operation in the operation state ST1 thus ends. In the secondary-side circuitry, the current I9 flows through the winding 22A, the capacitor Cout and the load apparatus LD, the diode DA, and the winding 22A in this order. Electric power is thereby transferred from the primary-side circuitry to the secondary-side circuitry.

In the period P2 starting from the timing t2, as illustrated in FIG. 2, the transistor S1 turns into the on-state from the off-state, the transistor S2 turns into the off-state from the on-state, the transistors S3 to S5 remain on, and the transistor S6 remains off. In this period P2, the operation state ST turns into the operation state ST3 (FIG. 4C).

In the operation state ST3, in the primary-side circuitry the current I1 flows through the node N3, the transistor S5, the node N4, the inductor 14, the node N5, the inductor 13, and the node N2 in this order. The current I2 flows through the node N3, the resonant capacitor Cr, the winding 21 of the transformer 20, the resonant inductor Lr, the node N1, the transistor S1, and the voltage line L11 in this order. The current I3 flows through the node N2, the transistor S3, the reference voltage line L12, the direct-current power supply apparatus PDC, the voltage line L11, the transistor S4, and the node N3 in this order.

In the transistor S1, the current flows through the parasitic diode Dp during the dead time Td, and after the gate signal G1 changes from the low level to the high level, the current flows through the body of the transistor S1 (parts (A) and (D) of FIG. 3). In this way, the transistor S1 is able to change from the off-state to the on-state with the voltage between the drain and the source being low, and is thus able to achieve what is called the soft switching. As a result, it is possible to increase efficiency in the power conversion system 1.

In this way, in the configuration including a resonant circuit (the resonant inductor Lr and the resonant capacitor Cr), the current I9 flows through the secondary-side circuit as with the operation state ST2 (FIG. 4B) during, within this period P2, a period when energy stored in the resonant circuit is released. Electric power is thereby transferred from the primary-side circuitry to the secondary-side circuitry.

In the period P3 starting from the timing t3, as illustrated in FIG. 2, the transistors S2 and S6 change from the off-state to the on-state, the transistors S3 and S4 change from the on-state to the off-state, and the transistors S1 and S5 remain on. In this period P3, the operation state ST first turns into the operation state ST4 (FIG. 4D), and thereafter turns into the operation state ST5 (FIG. 4E).

In the operation state ST4 (FIG. 4D), in the primary-side circuitry the current I1 flows through the node N4, the inductor 14, the node N5, the inductor 13, the node N2, the transistor S2, and the node N1 in this order. The current I2 flows through the node N1, the resonant inductor Lr, the winding 21 of the transformer 20, the resonant capacitor Cr, the node N3, the transistor S5, and the node N4 in this order. The current I3 flows through the node N1, the transistor S1, the voltage line L11, the direct-current power supply apparatus PDC, the reference voltage line L12, the transistor S6, and the node N4 in this order. Thus, the current I1 flowing through the inductors 13 and 14 is larger in amount than the current I2 flowing through the transformer. Accordingly, the current I3 flows to allow energy to be regenerated in the direct-current power supply apparatus PDC.

In the transistors S2 and S6, the current flows through the parasitic diode Dp during the dead time Td, and after the gate signals G2 and G6 change from the low level to the high level, the current flows through the bodies of the transistors S2 and S6 (parts (A), (E), and (J) of FIG. 3). In this way, the transistors S2 and S6 are each able to change from the off-state to the on-state with the voltage between the drain and the source being low, and are thus each able to achieve what is called the soft switching. As a result, it is possible to increase efficiency in the power conversion system 1.

As illustrated in parts (D) and (J) of FIG. 3, the currents IS1 and IS6 gradually decrease in absolute value, and change from negative to positive. This results in a change from the operation state ST4 (FIG. 4D) to the operation state ST5 (FIG. 4E).

In the operation state ST5, in the primary-side circuitry the current I1 flows through the node N4, the inductor 14, the node N5, the inductor 13, the node N2, the transistor S2, and the node N1 in this order. The current I2 flows through the node N1, the resonant inductor Lr, the winding 21 of the transformer 20, the resonant capacitor Cr, the node N3, the transistor S5, and the node N4 in this order. The current I3 flows through the node N4, the transistor S6, the reference voltage line L12, the direct-current power supply apparatus PDC, the voltage line L11, the transistor S1, and the node N1 in this order. That is, after the change from the operation state ST4 to the operation state ST5, the direction of the current I3 becomes opposite to that before the change, and the regeneration operation in the operation state ST4 thus ends. In the secondary-side circuitry, the current I9 flows through the winding 22B, the capacitor Cout and the load apparatus LD, the diode DB, and the winding 22B in this order. Electric power is thereby transferred from the primary-side circuitry to the secondary-side circuitry.

In the period P4 starting from the timing t4, as illustrated in FIG. 2, the transistor S4 turns into the on-state from the off-state, the transistor S5 turns into the off-state from the on-state, the transistors S1, S2, and S6 remain on, and the transistor S3 remains off. In this period P4, the operation state ST turns into the operation state ST6 (FIG. 4F).

In the operation state ST6, in the primary-side circuitry the current I1 flows through the node N1, the transistor S2, the node N2, the inductor 13, the node N5, the inductor 14, and the node N4 in this order. The current I2 flows through the node N1, the resonant inductor Lr, the winding 21 of the transformer 20, the resonant capacitor Cr, the node N3, the transistor S4, and the voltage line L11 in this order. The current I3 flows through the node N4, the transistor S6, the reference voltage line L12, the direct-current power supply apparatus PDC, the voltage line L11, the transistor S1, and the node N1 in this order.

In the transistor S4, the current flows through the parasitic diode Dp during the dead time Td, and after the gate signal G4 changes from the low level to the high level, the current flows through the body of the transistor S4 (parts (A) and (H) of FIG. 3). In this way, the transistor S4 is able to change from the off-state to the on-state with the voltage between the drain and the source being low, and is thus able to achieve what is called the soft switching. As a result, it is possible to increase efficiency in the power conversion system 1.

In this way, in the configuration including the resonant circuit (the resonant inductor Lr and the resonant capacitor Cr), the current I9 flows through the secondary-side circuit as with the operation state ST5 (FIG. 4E) during, within this period P4, a period when the energy stored in the resonant circuit is released. Electric power is thereby transferred from the primary-side circuitry to the secondary-side circuitry.

As described above, the power conversion system 1 is provided with the arms 11 and 12, the inductors 13 and 14, and the capacitor 15. The arm 11 is provided on a first path coupling the input terminal T11 and the input terminal T12 to each other, and includes the transistor S1 provided between the input terminal T11 and the node N1, the transistor S2 provided between the node N1 and the node N2, and the transistor S3 provided between the node N2 and the input terminal T12. The arm 12 is provided on a second path coupling the input terminal T11 and the input terminal T12 to each other, and includes the transistor S4 provided between the input terminal T11 and the node N3, the transistor S5 provided between the node N3 and the node N4, and the transistor S6 provided between the node N4 and the input terminal T12. The inductor 13 is provided between the node N2 and the node N5. The inductor 14 is provided between the node N4 and the node N5. The capacitor 15 is provided between the node N5 and the input terminal T12. As a result, the power conversion system 1 operates as illustrated in FIG. 2 and thereby changes the duty ratio of the alternating-current voltage Vac to change the electric power to be transferred from the primary-side circuitry to the secondary-side circuitry.

Specifically, the control circuit 19 is able to control the switching operations of the transistors S1 to S6 to change the on-duty ratios of the transistors S1, S2, S4, and S5 on the basis of the output voltage Vout and to maintain the on-duty ratios of the transistors S3 and S6. For example, as illustrated in FIG. 2, in a period during which the transistor S3 is on, the control circuit 19 changes a switching timing at which the transistor S1 changes from the off-state to the on-state and a switching timing at which the transistor S2 changes from the on-state to the off-state. Further, in a period during which the transistor S6 is on, the control circuit 19 changes a switching timing at which the transistor S4 changes from the off-state to the on-state and a switching timing at which the transistor S5 changes from the on-state to the off-state. The control circuit 19 thereby changes the on-duty ratios of the transistors S1, S2, S4, and S5. Accordingly, for example, in a case where the voltage (the input voltage Vin) supplied from the direct-current power supply apparatus PDC is high, it is possible to maintain the output voltage Vout by reducing the on-duty ratios of the transistors S2 and S5 and increasing the on-duty ratios of the transistors S1 and S4. Further, for example, in a case where the voltage (the input voltage Vin) supplied from the direct-current power supply apparatus PDC is low, it is possible to maintain the output voltage Vout by increasing the on-duty ratios of the transistors S2 and S5 and reducing the on-duty ratios of the transistors S1 and S4. The on-duty ratios of the transistors S1, S2, S4, and S5 are set in a range from, for example, 50% to 100% both inclusive. This makes it possible for the power conversion system 1 to widen an input voltage range.

Further, in the power conversion system 1, as illustrated in part (A) of each of FIGS. 2 and 3, for example, in a period near the timing t1 during which the transistor S2 is on, the transistor S3 is turned on at a timing at which the dead time Td has elapsed from a timing of turning-off of the transistor S1. Further, for example, in a period near the timing t2 during which the transistor S3 is on, the transistor S1 is turned on at a timing at which the dead time Td has elapsed from a timing of turning-off of the transistor S2. Further, for example, in a period near the timing t3 during which the transistor S1 is on, the transistor S2 is turned on at a timing at which the dead time Td has elapsed from a timing of turning-off of the transistor S3. The same applies to the transistors S4 to S6. In the power conversion system 1, it is thus possible for the transistors S1 to S6 to perform soft switching. This makes it possible to increase efficiency.

[Effects]

As described above, in the present embodiment, the arms 11 and 12, the inductors 13 and 14, and the capacitor 15 are provided. The arm 11 is provided on the first path coupling the input terminal T11 and the input terminal T12 to each other, and includes the transistor S1 provided between the input terminal T11 and the node N1, the transistor S2 provided between the node N1 and the node N2, and the transistor S3 provided between the node N2 and the input terminal T12. The arm 12 is provided on the second path coupling the input terminal T11 and the input terminal T12 to each other, and includes the transistor S4 provided between the input terminal T11 and the node N3, the transistor S5 provided between the node N3 and the node N4, and the transistor S6 provided between the node N4 and the input terminal T12. The inductor 13 is provided between the node N2 and the node N5. The inductor 14 is provided between the node N4 and the node N5. The capacitor 15 is provided between the node N5 and the input terminal T12. This makes it possible to widen the input voltage range.

According to the present embodiment, the on-duty ratios of the transistors S1, S2, S4, and S5 are changed on the basis of the output voltage, and the on-duty ratios of the transistors S3 and S6 are maintained. This makes it possible to widen the input voltage range.

According to the present embodiment, in the period during which the transistor S2 is on, the transistor S3 is turned on at the timing at which a predetermined time has elapsed from the timing of turning-off of the transistor S1; in the period during which the transistor S3 is on, the transistor S1 is turned on at the timing at which the predetermined time has elapsed from the timing of turning-off of the transistor S2; and in the period during which the transistor S1 is on, the transistor S2 is turned on at the timing at which the predetermined time has elapsed from the timing of turning-off of the transistor S3. This makes it possible to increase efficiency.

Modification Example 1-1

Figure 5:
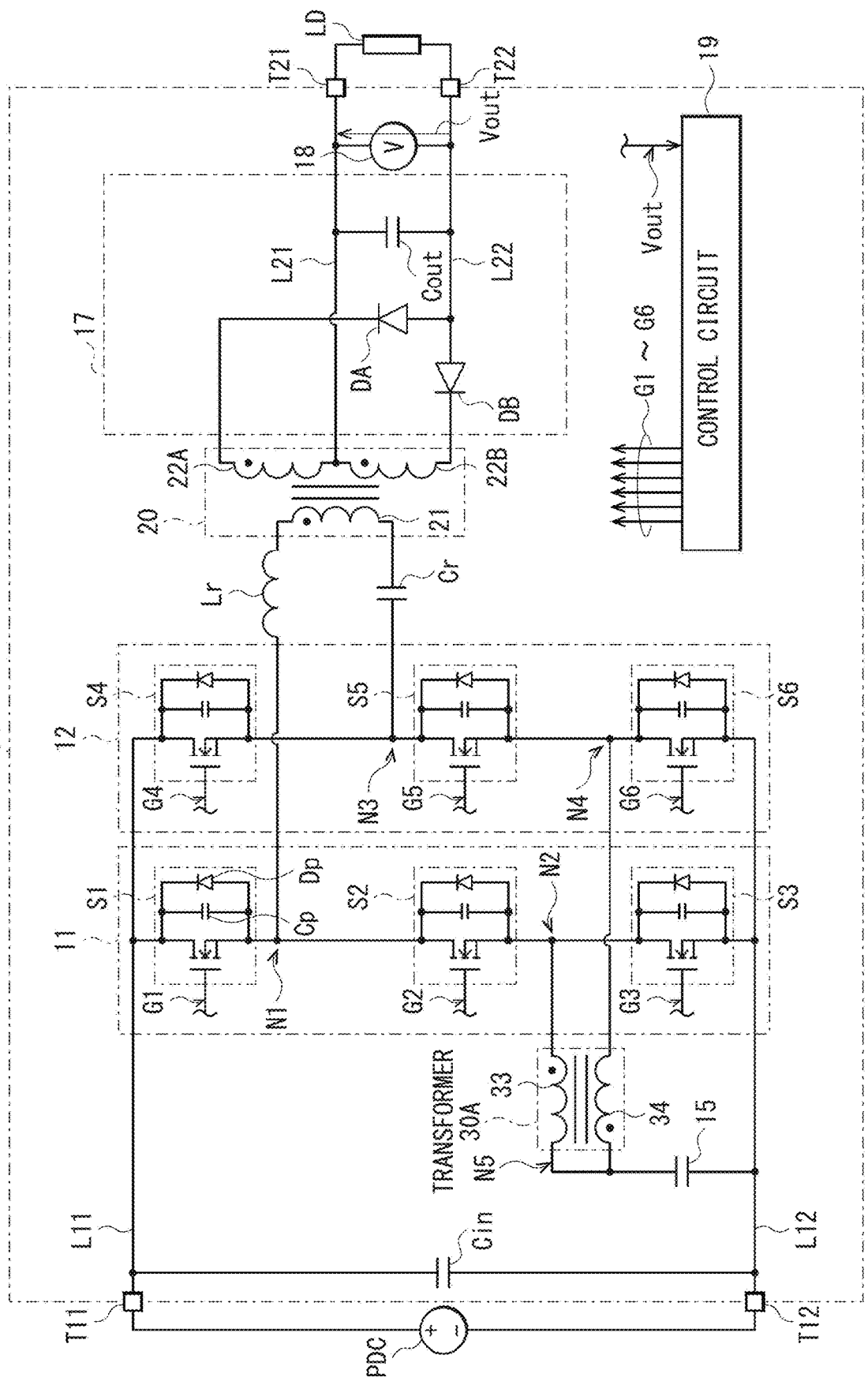
FIG. 5 is a circuit diagram illustrating a configuration example of a power conversion system according to a modification example of the example embodiment.

The inductors 13 and 14 are provided in the foregoing embodiment; however, this is non-limiting. Alternatively, for example, a transformer 30A may be provided, as in a power conversion system 1A illustrated in FIG. 5. The power conversion system 1A includes a power conversion apparatus 10A. The power conversion apparatus 10A includes the transformer 30A. The transformer 30A includes windings 33 and 34. One end of the winding 33 is coupled to the node N2 of the arm 11, and another end of the winding 33 is coupled to the node N5. One end of the winding 34 is coupled to the node N5, and another end of the winding 34 is coupled to the node N4 of the arm 12. The winding 33 corresponds to the inductor 13 according to the foregoing first embodiment, and the winding 34 corresponds to the inductor 14 according to the foregoing first embodiment. As illustrated in part (H) of FIG. 2, the inductor current IL13 flowing through the inductor 13 and the inductor current IL14 flowing through the inductor 14 are of almost the same magnitude, and are opposite to each other in polarity. Thus, the inductors 13 and 14 are replaced with the transformer 30A in this modification example. By using the transformer 30A in place of the two inductors 13 and 14 in this way, it is possible to make the circuitry smaller. The transformer 30A corresponds to a specific example of a "second transformer" in one embodiment of the disclosure.

Figure 6:
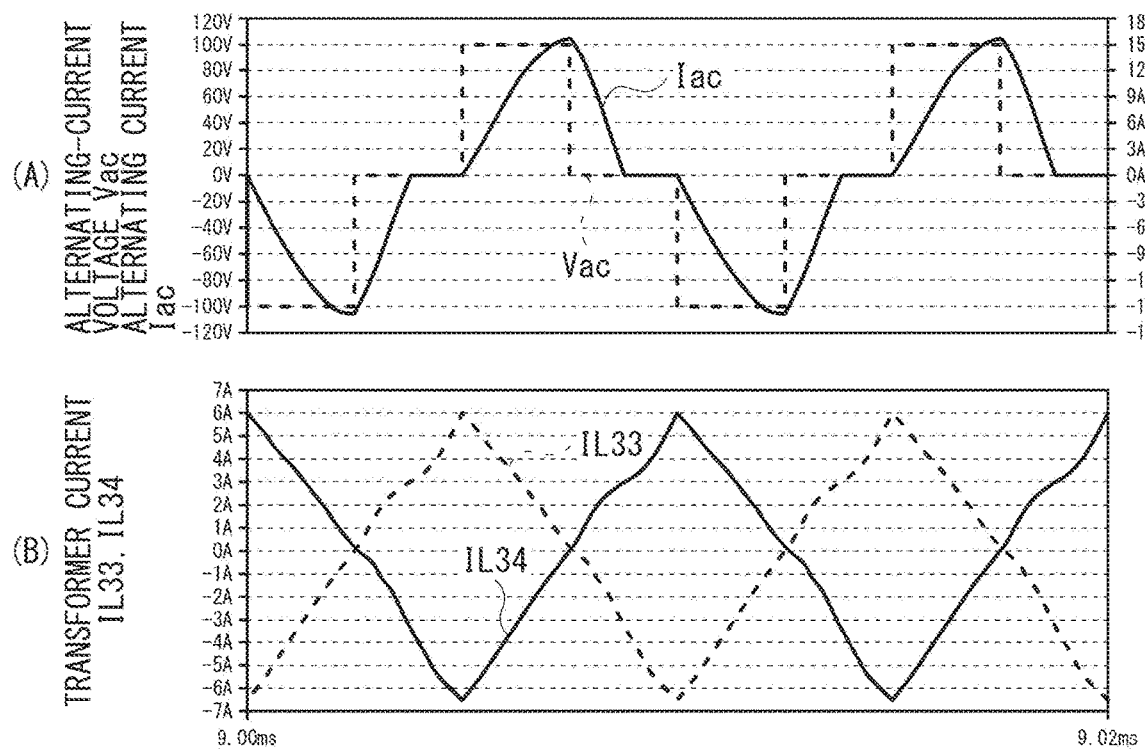
FIG. 6 is a timing waveform diagram illustrating an operation example of the power conversion system illustrated in FIG. 5.

FIG. 6 illustrates an operation example of the power conversion system 1A. Part (A) of FIG. 6 illustrates the waveform of the voltage (alternating-current voltage Vac) at the node N1 based on the voltage at the node N3, and the waveform of the current (the alternating current Iac) flowing from the one end (on the node N1 side) to the other end (on the node N3 side) of the winding 21 of the transformer 20. Part (B) of FIG. 6 illustrates a waveform of a current (a transformer current IL33) flowing through the winding 33 from the node N5 toward the node N2, and a waveform of a current (a transformer current IL34) flowing through the winding 34 from the node N5 toward the node N4. In this example, the direct-current power supply apparatus PDC supplies a direct-current voltage of 100 V to the power conversion apparatus 10A. Parts (A) and (B) of FIG. 6 correspond to parts (G) and (H) of FIG. 2 according to the foregoing embodiment. As illustrated, the power conversion system 1A is able to operate similarly to the power conversion system 1 according to the foregoing embodiment.

Modification Examples 1-2

The rectifying and smoothing circuit 17 illustrated in FIG. 1 is provided in the foregoing embodiment; however, this is non-limiting. Some examples will be presented and described in detail below.

Figure 7:
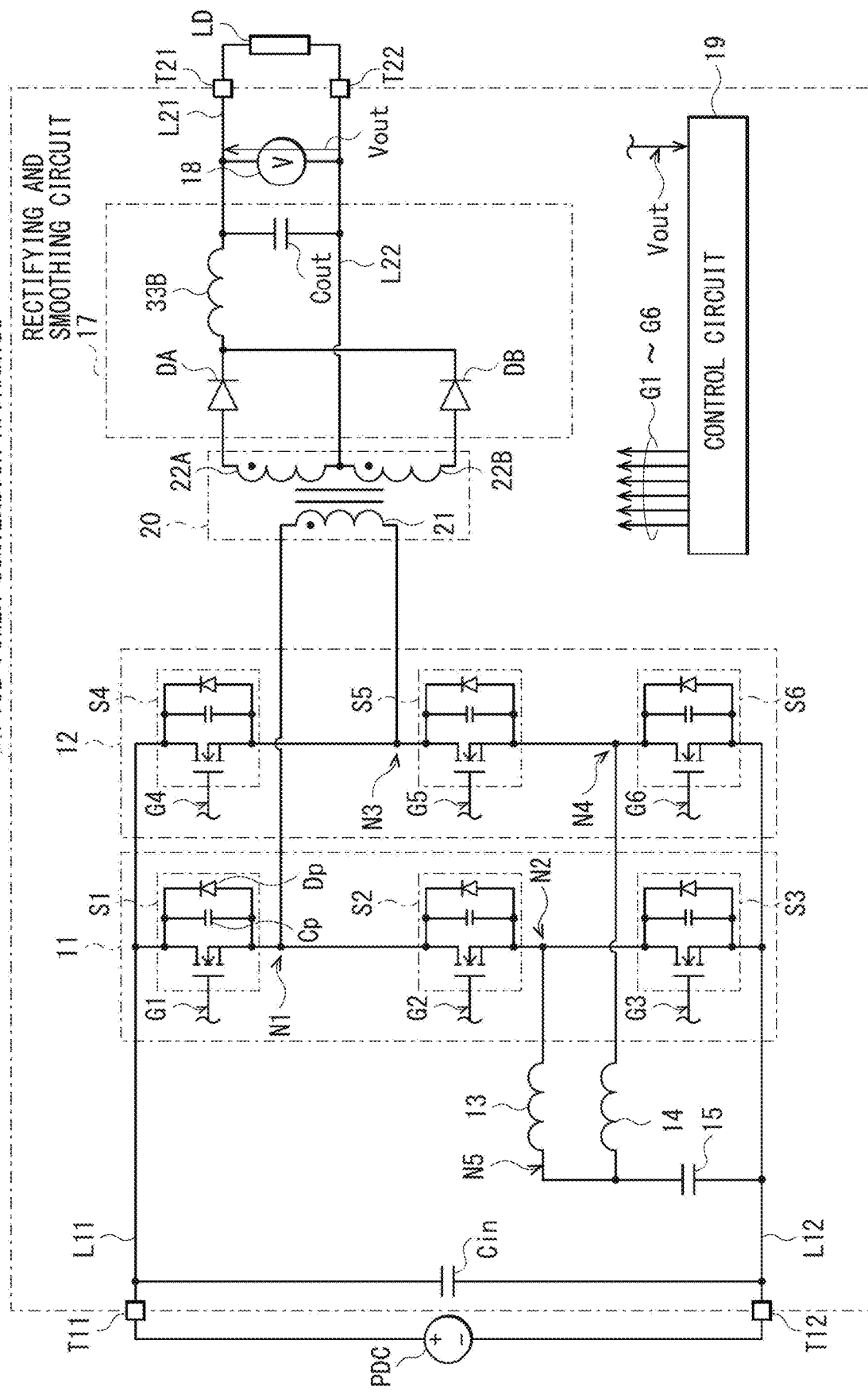
FIG. 7 is a circuit diagram illustrating a configuration example of a power conversion system according to another modification example of the example embodiment.

FIG. 7 illustrates a configuration example of a power conversion system 1B according to the present modification example. The power conversion system 1B includes a power conversion apparatus 10B. The power conversion apparatus 10B includes the arms 11 and 12, the transformer 20, and a rectifying and smoothing circuit 17B. The one end of the winding 21 of the transformer 20 is coupled to the node N1 of the arm 11, and the other end of the winding 21 is coupled to the node N3 of the arm 12. The one end of the winding 22A is coupled to the anode of the diode DA of the rectifying and smoothing circuit 17B, and the other end of the winding 22A is coupled to the reference voltage line L22. The one end of the winding 22B is coupled to the reference voltage line L22, and the other end of the winding 22B is coupled to the anode of the diode DB of the rectifying and smoothing circuit 17B. The rectifying and smoothing circuit 17B includes the diodes DA and DB, an inductor 33B, and the capacitor Cout. The anode of the diode DA is coupled to the one end of the winding 22A of the transformer 20, and the cathode of the diode DA is coupled to the cathode of the diode DB and one end of the inductor 33B. The anode of the diode DB is coupled to the other end of the winding 22B of the transformer 20, and the cathode of the diode DB is coupled to the cathode of the diode DA and the one end of the inductor 33B. The one end of the inductor 33B is coupled to the cathodes of the diodes DA and DB, and another end of the inductor 33B is coupled to the voltage line L21. The one end of the capacitor Cout is coupled to the voltage line L21, and the other end of the capacitor Cout is coupled to the reference voltage line L22. In this example, the one end of the inductor 33B is coupled to the cathodes of the diodes DA and DB, and the other end of the inductor 33B is coupled to the voltage line L21; however, this is non-limiting. Alternatively, for example, the one end of the inductor 33B may be coupled to the other end of the winding 22A and the one end of the winding 22B, and the other end of the inductor 33B may be coupled to the reference voltage line L22. The rectifying and smoothing circuit 17B corresponds to a specific example of the "rectifying circuit" in one embodiment of the disclosure. The diodes DA and DB correspond to a specific example of the "multiple rectifying devices" in one embodiment of the disclosure.

In this example, the resonant circuit (the resonant inductor Lr and the resonant capacitor Cr) is omitted. In this configuration, in the case where the load current flowing through the load apparatus LD is to be maintained and where the voltage (the input voltage Vin) supplied from the direct-current power supply apparatus PDC increases, the control circuit 19 maintains the switching period Tsw constant and controls the duty ratio of the alternating-current voltage Vac to be lower by the increase of the input voltage. Specifically, the control circuit 19 reduces the lengths of the periods P1 and P3 and increases the lengths of the periods P2 and P4. This makes it possible for the power conversion system 1B to maintain the output voltage Vout.

Figure 8:
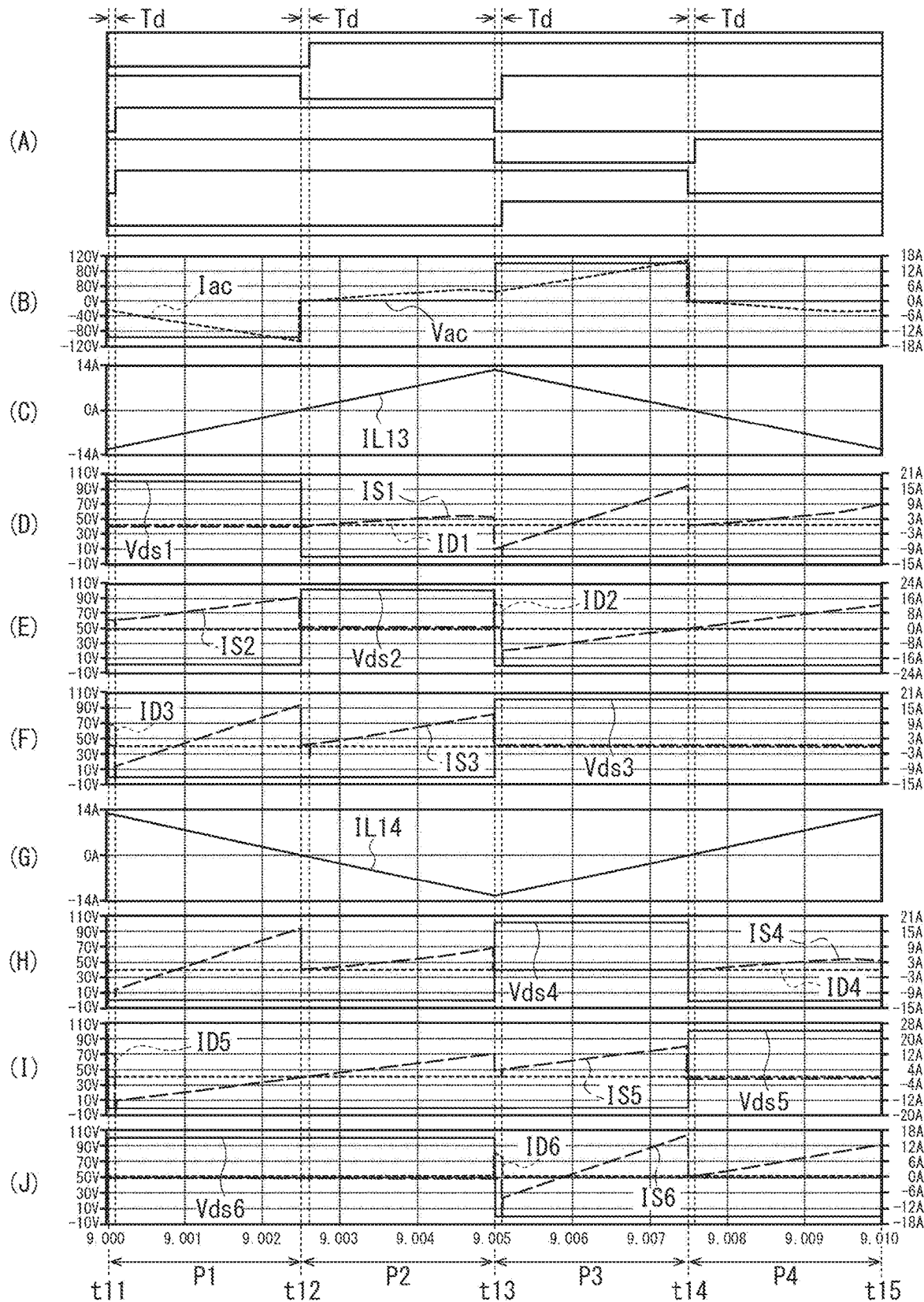
FIG. 8 is a timing waveform diagram illustrating an operation example of the power conversion system illustrated in FIG. 7.

FIG. 8 illustrates an operation example of the power conversion system 1B. FIG. 8 corresponds to FIG. 3 according to the foregoing embodiment. As illustrated, the power conversion system 1B is able to operate similarly to the power conversion system 1 according to the foregoing embodiment.

Figure 9:
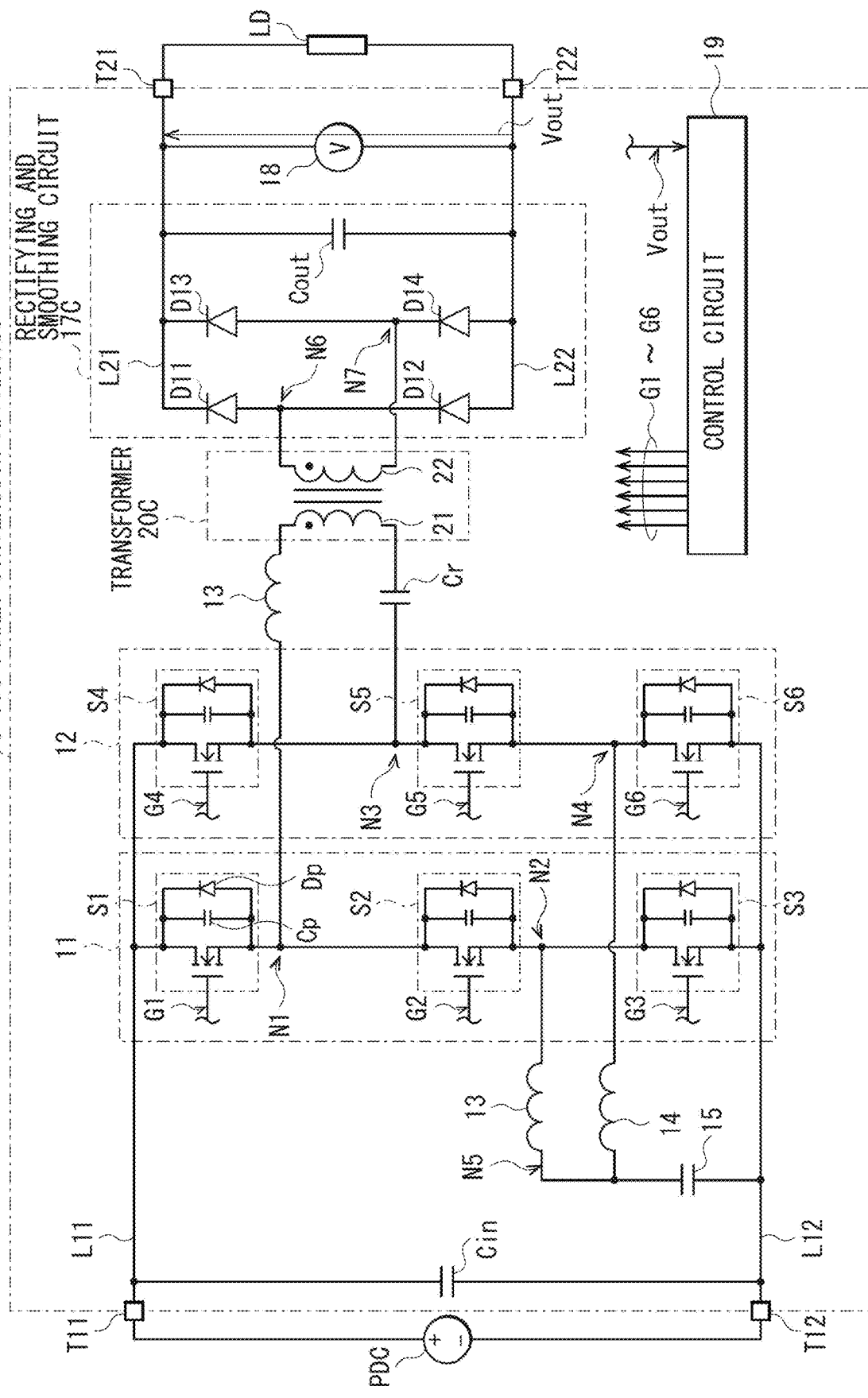
FIG. 9 is a circuit diagram illustrating a configuration example of a power conversion system according to another modification example of the example embodiment.

FIG. 9 illustrates a configuration example of a power conversion system 1C according to the present modification example. The power conversion system 1C includes a power conversion apparatus 10C. The power conversion apparatus 10C includes a transformer 20C and a rectifying and smoothing circuit 17C. The transformer 20C includes the winding 21 and a winding 22. The one end of the winding 21 is coupled to the other end of the resonant inductor Lr, and the other end of the winding 21 is coupled to the other end of the resonant capacitor Cr. One end of the winding 22 is coupled to a node N6 of the rectifying and smoothing circuit 17C, and another end of the winding 22 is coupled to a node N7 of the rectifying and smoothing circuit 17C. The rectifying and smoothing circuit 17C is a bridge circuit, and includes diodes D11 to D14 and the capacitor Cout. An anode of the diode D11 is coupled to the node N6, and a cathode of the diode D11 is coupled to the voltage line L21. An anode of the diode D12 is coupled to the reference voltage line L22, and a cathode of the diode D12 is coupled to the node N6. An anode of the diode D13 is coupled to the node N7, and a cathode of the diode D13 is coupled to the voltage line L21. An anode of the diode D14 is coupled to the reference voltage line L22, and a cathode of the diode D14 is coupled to the node N7. The one end of the capacitor Cout is coupled to the voltage line L21, and the other end of the capacitor Cout is coupled to the reference voltage line L22. The transformer 20C corresponds to a specific example of the "first transformer" in one embodiment of the disclosure. The rectifying and smoothing circuit 17C corresponds to a specific example of the "rectifying circuit" in one embodiment of the disclosure. The diodes D11 to D14 correspond to a specific example of the "multiple rectifying devices" in one embodiment of the disclosure.

Figure 10:
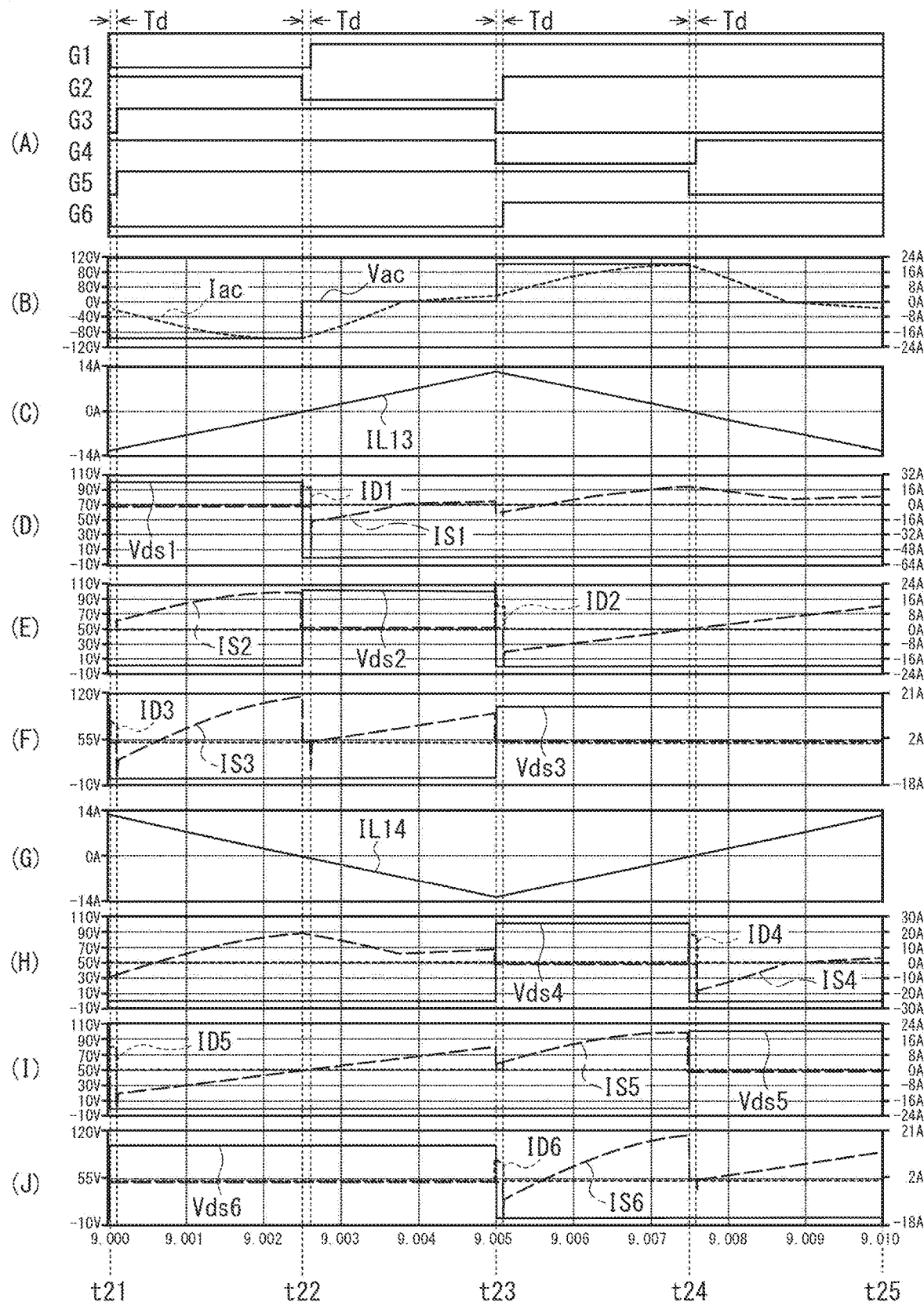
FIG. 10 is a timing waveform diagram illustrating an operation example of the power conversion system illustrated in FIG. 9.

FIG. 10 illustrates an operation example of the power conversion system 1C. FIG. 10 corresponds to FIG. 3 according to the foregoing embodiment. As illustrated, the power conversion system 1C is able to operate similarly to the power conversion system 1 according to the foregoing embodiment.

Other Modification Examples

Further, two or more of these modification examples may be combined.

2. Second Embodiment

Next, a description will be given of a power conversion system 2 according to a second embodiment. In the foregoing first embodiment, the two arms 11 and 12 are provided, whereas in the present embodiment, a single arm is provided instead. Note that components substantially the same as those in the power conversion system 1 according to the foregoing first embodiment are denoted with the same reference signs and descriptions thereof are omitted where appropriate.

Figure 11:
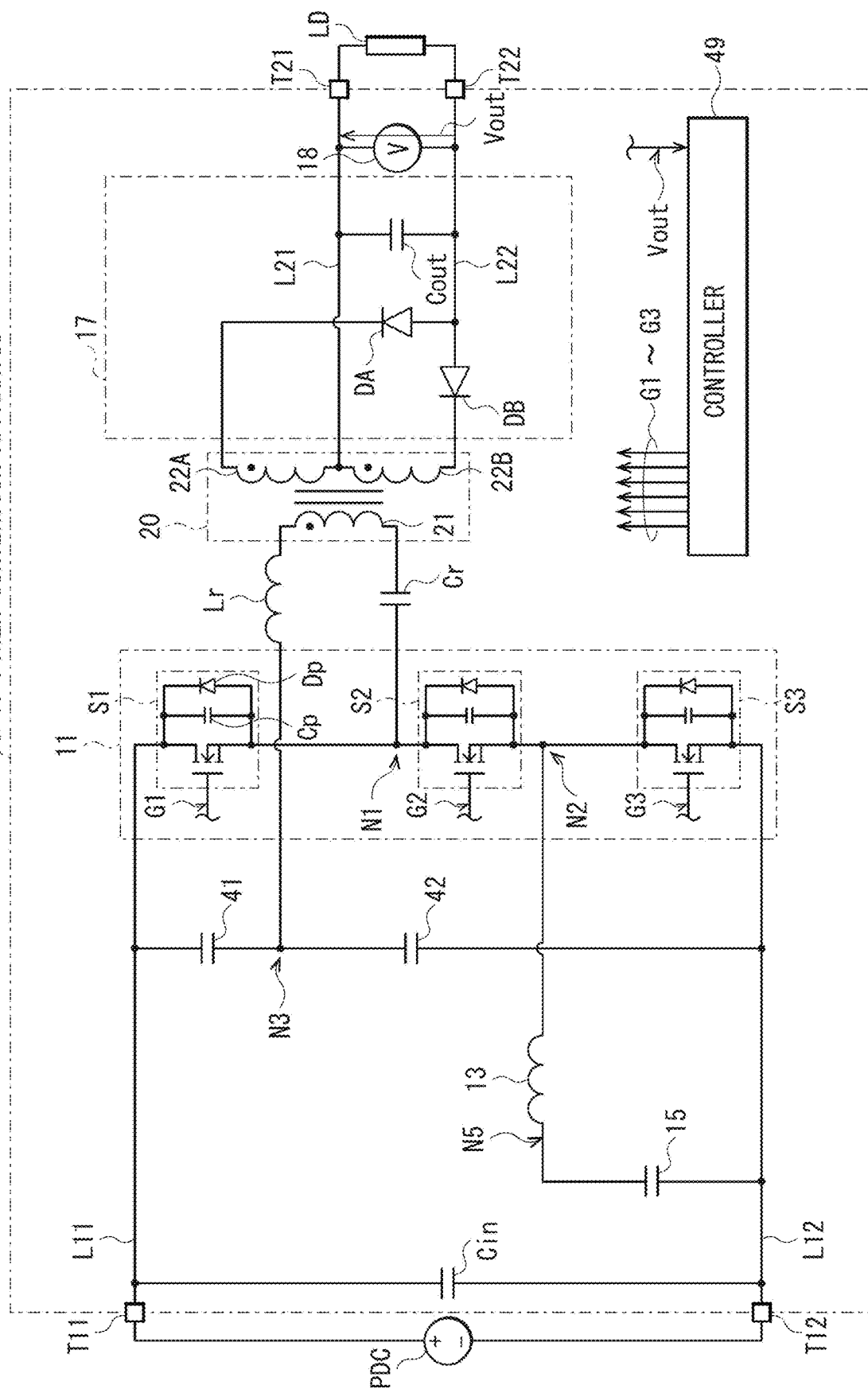
FIG. 11 is a circuit diagram illustrating a configuration example of a power conversion system according to one example embodiment of the disclosure.

FIG. 11 illustrates a configuration example of the power conversion system 2. The power conversion system 2 includes the direct-current power supply apparatus PDC, a power conversion apparatus 40, and the load apparatus LD.

The power conversion apparatus 40 is configured to convert electric power by stepping down a voltage (the input voltage) supplied from the direct-current power supply apparatus PDC and to supply the converted electric power to the load apparatus LD. The power conversion apparatus 40 includes the arm 11, the inductor 13, the capacitor 15, and capacitors 41 and 42. That is, while the power conversion apparatus 10 (FIG. 1) according to the foregoing first embodiment includes the two arms 11 and 12, the power conversion apparatus 40 according to the present embodiment includes the single arm 11.

The arm 11 is provided on the path coupling the voltage line L11 and the reference voltage line L12 to each other. The arm 11 includes the three transistors S1 to S3. The transistors S1 to S3 are configured to perform respective switching operations on the basis of the gate signals G1 to G3. As in the case of the foregoing first embodiment, the transistors S1 to S3 are each configured by an N-type field-effect transistor (FET), for example.

The transistor S1 is provided between the voltage line L11 and the node N1, and is configured to couple the node N1 to the voltage line L11 by being turned on. The drain of the transistor S1 is coupled to the voltage line L11, the gate of the transistor S1 is supplied with the gate signal G1, and the source of the transistor S1 is coupled to the node N1. The transistor S2 is provided between the node N1 and the node N2, and is configured to couple the node N1 to the node N2 by being turned on. The drain of the transistor S2 is coupled to the node N1, the gate of the transistor S2 is supplied with the gate signal G2, and the source of the transistor S2 is coupled to the node N2. The transistor S3 is provided between the node N2 and the reference voltage line L12, and is configured to couple the node N2 to the reference voltage line L12 by being turned on. The drain of the transistor S3 is coupled to the node N2, the gate of the transistor S3 is supplied with the gate signal G3, and the source of the transistor S3 is coupled to the reference voltage line L12.

The one end of the inductor 13 is coupled to the node N2 of the arm 11, and the other end of the inductor 13 is coupled to the node N5. The one end of the capacitor 15 is coupled to the node N5, and the other end of the capacitor 15 is coupled to the reference voltage line L12.

One end of the capacitor 41 is coupled to the voltage line L11, and another end of the capacitor 41 is coupled to the node N3. One end of the capacitor 42 is coupled to the node N3, and another end of the capacitor 42 is coupled to the reference voltage line L12. The node N3 is a coupling point between the other end of the capacitor 41 and the one end of the capacitor 42.

The one end of the resonant inductor Lr is coupled to the node N3, and the other end of the resonant inductor Lr is coupled to the one end of the winding 21 of the transformer 20. The one end of the resonant capacitor Cr is coupled to the node N1 of the arm 11, and the other end of the resonant capacitor Cr is coupled to the other end of the winding 21 of the transformer 20.

A control circuit 49 is configured to control an operation of the power conversion apparatus 40 by controlling the operation of the arm 11 on the basis of the output voltage Vout detected by the voltage sensor 18. Specifically, the control circuit 49 controls the operation of the power conversion apparatus 40 by generating the gate signals G1 to G3 on the basis of the output voltage Vout and, with use of the gate signals G1 to G3, performing PWM control on variations of the voltage (the input voltage Vin) supplied from the direct-current power supply apparatus PDC, and pulse frequency modulation (PFM) control on variations of the load current.

The arm 11 corresponds to a specific example of an "arm" in one embodiment of the disclosure. The transistor S1 corresponds to a specific example of the "first switching device" in one embodiment of the disclosure. The transistor S2 corresponds to a specific example of the "second switching device" in one embodiment of the disclosure. The transistor S3 corresponds to a specific example of the "third switching device" in one embodiment of the disclosure. The node N1 corresponds to a specific example of the "first node" in one embodiment of the disclosure. The node N2 corresponds to a specific example of the "second node" in one embodiment of the disclosure. The inductor 13 corresponds to a specific example of an "inductor" in one embodiment of the disclosure. The capacitor 15 corresponds to a specific example of the "first capacitor" in one embodiment of the disclosure. The node N5 corresponds to a specific example of the "third node" in one embodiment of the disclosure. The capacitor 41 corresponds to a specific example of a "second capacitor" in one embodiment of the disclosure. The capacitor 42 corresponds to a specific example of a "third capacitor" in one embodiment of the disclosure. The node N3 corresponds to a specific example of the "fourth node" in one embodiment of the disclosure. The transformer 20 corresponds to a specific example of a "transformer" in one embodiment of the disclosure. The control circuit 49 corresponds to a specific example of the "control circuit" in one embodiment of the disclosure.

FIG. 12 illustrates a detailed operation of the power conversion system 2. Part (A) of FIG. 12 illustrates the waveforms of the gate signals G1 to G3. Part (B) of FIG. 12 illustrates the waveform of the voltage (the alternating-current voltage Vac) at the node N3 based on the voltage at the node N1 and the waveform of the current (the alternating current Iac) flowing from the one end (on the node N1 side) to the other end (on the node N3 side) of the winding 21 of the transformer 20. Part (C) of FIG. 12 illustrates the waveform of the current (the inductor current IL13) flowing through the inductor 13 from the node N5 toward the node N2. Part (D) of FIG. 12 illustrates the waveform of the voltage Vds1 between the drain and the source of the transistor S1, the waveform of the current IS1 flowing from the drain to the source of the body of the transistor S1, and the waveform of the current ID1 flowing through the parasitic diode Dp of the transistor S1. Part (E) of FIG. 12 illustrates the waveform of the voltage Vds2 between the drain and the source of the transistor S2, the waveform of the current IS2 flowing from the drain to the source of the body of the transistor S2, and the waveform of the current ID2 flowing through the parasitic diode Dp of the transistor S2. Part (F) of FIG. 12 illustrates the waveform of the voltage Vds3 between the drain and the source of the transistor S3, the waveform of the current IS3 flowing from the drain to the source of the body of the transistor S3, and the waveform of the current ID3 flowing through the parasitic diode Dp of the transistor S3.

FIGS. 13A to 13D illustrate operations of the power conversion system 2 in four operation states ST11 to ST14, respectively.

In a period P11 starting from a timing t41, as illustrated in part (A) of FIG. 12, the transistor S2 changes from the off-state to the on-state, the transistor S3 changes from the on-state to the off-state, and the transistor S1 remains on. In this period P11, the operation state ST first turns into the operation state ST11 (FIG. 13A), and thereafter turns into the operation state ST12 (FIG. 13B).

In the operation state ST11 (FIG. 13A), in the primary-side circuitry the current I1 flows through the reference voltage line L12, the capacitor 15, the node N5, the inductor 13, the node N2, the transistor S2, and the node N1 in this order. The current I2 flows through the node N1, the resonant capacitor Cr, the winding 21 of the transformer 20, the resonant inductor Lr, and the node N3 in this order. The current I3 flows through the node N3, the capacitor 41, and the voltage line L11 in this order, and also flows through the node N3, the capacitor 42, and the reference voltage line L12 in this order. A current I4 flows through the voltage line L11, the transistor S1, and the node N1 in this order.

In the transistor S2, the current flows through the parasitic diode Dp during the dead time Td, and after the gate signal G2 changes from the low level to the high level, the current flows through the body of the transistor S2 (parts (A) and (E) of FIG. 12). In this way, the transistor S2 is able to change from the off-state to the on-state with the voltage between the drain and the source being low, and is thus able to achieve what is called the soft switching. As a result, it is possible to increase efficiency in the power conversion system 2.

As illustrated in part (E) of FIG. 12, the current IS2 gradually decreases in absolute value, and changes from negative to positive. This results in a change from the operation state ST11 (FIG. 13A) to the operation state ST12 (FIG. 13B).

In the operation state ST12, in the primary-side circuitry the current I1 flows through the node N1, the transistor S2, the node N2, the inductor 13, the node N5, the capacitor 15, and the reference voltage line L12 in this order. The current I2 flows through the node N1, the resonant capacitor Cr, the winding 21 of the transformer 20, the resonant inductor Lr, and the node N3 in this order. The current I3 flows through the node N3, the capacitor 41, and the voltage line L11 in this order, and also flows through the node N3, the capacitor 42, and the reference voltage line L12 in this order. The current I4 flows through the voltage line L11, the transistor S1, and the node N1 in this order. That is, in the operation state ST12, the direction of the current I1 is opposite to that in the operation state ST11.

In a period P12 starting from a timing t42, as illustrated in FIG. 12, the transistor S3 turns into the on-state from the off-state, the transistor S1 turns into the off-state from the on-state, and the transistor S2 remains on. In this period P12, the operation state ST turns into the operation state ST13 (FIG. 13C).

In the operation state ST13, in the primary-side circuitry the current I1 flows through the node N1, the transistor S2, the node N2, the inductor 13, the node N5, the capacitor 15, and the reference voltage line L12 in this order. The current I2 flows through the node N3, the resonant inductor Lr, the winding 21 of the transformer 20, the resonant capacitor Cr, and the node N1 in this order. The current I3 flows through the reference voltage line L12, the direct-current power supply apparatus PDC, the voltage line L11, the capacitor 41, and the node N3 in this order, and also flows through the reference voltage line L12, the capacitor 42, and the node N3 in this order. A current I5 flows through the reference voltage line L12, the transistor S3, and the node N2 in this order.

In the transistor S3, the current flows through the parasitic diode Dp during the dead time Td, and after the gate signal G3 changes from the low level to the high level, the current flows through the body of the transistor S3 (parts (A) and (F) of FIG. 12). In this way, the transistor S3 is able to change from the off-state to the on-state with the voltage between the drain and the source being low, and is thus able to achieve what is called the soft switching. As a result, it is possible to increase efficiency in the power conversion system 2.

In a period P13 starting from a timing t43, as illustrated in FIG. 12, the transistor S1 changes from the off-state to the on-state, the transistor S2 changes from the on-state to the off-state, and the transistor S3 remains on. In this period P13, the operation state ST turns into the operation state ST14 (FIG. 13D).

In the operation state ST14, in the primary-side circuitry the current I1 flows through the reference voltage line L12, the capacitor 15, the node N5, the inductor 13, the node N2, the transistor S3, and the reference voltage line L12 in this order. The current I2 flows through the node N3, the resonant inductor Lr, the winding 21 of the transformer 20, the resonant capacitor Cr, and the node N1 in this order. The current I3 flows through the voltage line L11, the capacitor 41, and the node N3 in this order, and also flows through the reference voltage line L12, the capacitor 42, and the node N3 in this order. The current I4 flows through the node N1, the transistor S1, and the voltage line L11 in this order.

In the transistor S1, the current flows through the parasitic diode Dp during the dead time Td, and after the gate signals G1 changes from the low level to the high level, the current flows through the body of the transistor S1 (parts (A) and (D) of FIG. 12). In this way, the transistor S1 is able to change from the off-state to the on-state with the voltage between the drain and the source being low, and is thus able to achieve what is called the soft switching. As a result, it is possible to increase efficiency in the power conversion system 2.

The control circuit 49 controls the operations of the transistors S1 and S2 to change the on-duty ratios of the transistors S1 and S2 in accordance with the output voltage Vout. Further, the control circuit 49 maintains the on-duty ratio of the transistor S3 at approximately 50%.

In changing the on-duty ratios of the transistors S1 and S2, the control circuit 49 changes a transition timing at which the gate signal G1 transitions from the low level to the high level near the timing t43 and a transition timing at which the gate signal G2 transitions from the high level to the low level near the timing t43. In this way, the power conversion system 2 changes a transition timing of the alternating-current voltage Vac near the timing 143 to thereby change the duty ratio of the alternating-current voltage Vac, as in the case of the first embodiment (FIG. 2). The duty ratio of the alternating-current voltage Vac is a ratio of time during which the alternating-current voltage Vac (part (B) of FIG. 12) is positive (the time of the period P12) to the time corresponding to the switching period Tsw. As a result, electric power to be transferred from the primary-side circuitry to the secondary-side circuitry changes in the power conversion system 2. By changing the on-duty ratios of the transistors S1 and S2 in accordance with the output voltage Vout, the control circuit 49 controls the operation of the power conversion system 2 to allow the output voltage Vout to be constant even in the case where the input voltage Vin varies.

As described above, the power conversion system 2 is provided with the arm 11, the inductor 13, and the capacitors 15, 41, and 42. The arm 11 is provided on the first path coupling the input terminal T11 and the input terminal T12 to each other, and includes the transistor S1 provided between the input terminal T11 and the node N1, the transistor S2 provided between the node N1 and the node N2, and the transistor S3 provided between the node N2 and the input terminal T12. The inductor 13 is provided between the node N2 and the node N5. The capacitor 15 is provided between the node N5 and the input terminal T12. The capacitor 41 is provided between the input terminal T11 and the node N3. The capacitor 42 is provided between the node N3 and the input terminal T12. With this configuration, the power conversion system 2 changes the duty ratio of the alternating-current voltage Vac to change the electric power to be transferred from the primary-side circuitry to the secondary-side circuitry, as in the case of the first embodiment.

Specifically, the control circuit 49 is able to control the switching operations of the transistors S1 to S3 to change the on-duty ratios of the transistors S1 and S2 on the basis of the output voltage Vout and to maintain the on-duty ratio of the transistor S3. For example, as illustrated in FIG. 12, the control circuit 49 changes the on-duty ratios of the transistors S1 and S2 by changing the switching timings of the transistors S1 and S2 in a period during which the transistor S3 is on. Accordingly, for example, in the case where the voltage (the input voltage) supplied from the direct-current power supply apparatus PDC is high, it is possible to maintain the output voltage Vout by increasing the on-duty ratio of the transistor S1 and reducing the on-duty ratio of the transistor S2. Further, for example, in the case where the voltage (the input voltage) supplied from the direct-current power supply apparatus PDC is low, it is possible to maintain the output voltage Vout by reducing the on-duty ratio of the transistor S1 and increasing the on-duty ratios of the transistor S2. The on-duty ratios of the transistors S1 and S2 are set in the range from, for example, 50% to 100% both inclusive. This makes it possible for the power conversion system 2 to widen the input voltage range.

Further, in the power conversion system 2, as illustrated in part (A) of FIG. 12, for example, in a period near the timing t41 during which the transistor S1 is on, the transistor S2 is turned on at a timing at which the dead time Td has elapsed from a timing of turning-off of the transistor S3. Further, for example, in a period near the timing t42 during which the transistor S2 is on, the transistor S3 is turned on at a timing at which the dead time Td has elapsed from a timing of turning-off of the transistor S1. Further, for example, in a period near the timing t43 during which the transistor S3 is on, the transistor S1 is turned on at a timing at which the dead time Td has elapsed from a timing of turning-off of the transistor S2. In the power conversion system 2, it is thus possible for the transistors S1 to S3 to perform soft switching. This makes it possible to increase efficiency.

Further, as compared with the power conversion system 1 (FIG. 1) according to the first embodiment, the power conversion system 2 makes it possible to reduce the number of transistors by virtue of the reduced number of arms, thus making it possible to simplify the circuitry.

As has been described, in the present embodiment, the arm 11, the inductor 13, and the capacitors 15, 41, and 42 are provided. The arm 11 is provided on the first path coupling the input terminal T11 and the input terminal T12 to each other, and includes the transistor S1 provided between the input terminal T11 and the node N1, the transistor S2 provided between the node N1 and the node N2, and the transistor S3 provided between the node N2 and the input terminal T12. The inductor 13 is provided between the node N2 and the node N5. The capacitor 15 is provided between the node N5 and the input terminal T12. The capacitor 41 is provided between the input terminal T11 and the node N3. The capacitor 42 is provided between the node N3 and the input terminal T12. This makes it possible to widen the input voltage range.

According to the present embodiment, the on-duty ratios of the transistors S1 and S2 are changed on the basis of the output voltage and the on-duty ratio of the transistor S3 is maintained. This makes it possible to widen the input voltage range.

According to the present embodiment, in the period during which the transistor S1 is on, the transistor S2 is turned on at the timing at which the predetermined time has elapsed from the timing of turning-off of the transistor S3; in the period during which the transistor S2 is on, the transistor S3 is turned on at the timing at which the predetermined time has elapsed from the timing of turning-off of the transistor S1; and in the period during which the transistor S3 is on, the transistor S1 is turned on at the timing at which the predetermined time has elapsed from the timing of turning-off of the transistor S2. This makes it possible to increase efficiency.

Modification Example 2

Modification Examples 1-2 of the foregoing first embodiment may each be applied to the power conversion system 2 according to the embodiment described above.

The disclosure has been described hereinabove with reference to the embodiments and the modification examples. However, the disclosure is not limited to the embodiments and the like, and may be modified in a variety of ways.

For example, in the foregoing embodiments, the diodes DA and DB are used as the rectifying devices in the rectifying and smoothing circuit 17; however, this is non-limiting. Alternatively, for example, a transistor may be used as the rectifying device. In such a case, it is possible to perform what is called synchronous rectification by turning on and off the transistor.

Embodiments of the disclosure may be configured as follows.

(1)

A power conversion apparatus including:
  a first power terminal including a first coupling terminal and a second coupling terminal;
  a first arm provided on a first path coupling the first coupling terminal and the second coupling terminal to each other, the first arm including a first switching device provided between the first coupling terminal and a first node, a second switching device provided between the first node and a second node, and a third switching device provided between the second node and the second coupling terminal;

a second arm provided on a second path coupling the first coupling terminal and the second coupling terminal to each other, the second arm including a fourth switching device provided between the first coupling terminal and a third node, a fifth switching device provided between the third node and a fourth node, and a sixth switching device provided between the fourth node and the second coupling terminal;

a first inductor provided between the second node and a fifth node;

a second inductor provided between the fourth node and the fifth node;

a first capacitor provided between the fifth node and the second coupling terminal;

a first transformer including a first winding and a second winding, the first winding being provided on a path coupling the first node and the third node to each other;

a rectifying circuit including multiple rectifying devices coupled to the second winding;

a second power terminal coupled to the rectifying circuit and including a third coupling terminal and a fourth coupling terminal; and a control circuit configured to control switching operations of the first arm and the second arm on a basis of a voltage at the second power terminal.

(2)

The power conversion apparatus according to (1), further including a resonant inductor and a resonant capacitor, the resonant inductor and the resonant capacitor being provided on the path coupling the first node and the third node to each other.

(3)

The power conversion apparatus according to (1) or (2), in which the power conversion apparatus includes a second transformer including a first winding and a second winding, the first winding of the second transformer includes the first inductor, and the second winding of the second transformer includes the second inductor.

(4)

The power conversion apparatus according to any one of (1) to (3), in which the control circuit is configured to control the switching operations to change first on-duty ratios of the first switching device, the second switching device, the fourth switching device, and the fifth switching device on the basis of the voltage at the second power terminal and maintain second on-duty ratios of the third switching device and the sixth switching device.

(5)

The power conversion apparatus according to (4), in which the control circuit is configured to:

turn on the third switching device in a first period;

turn on the sixth switching device in a second period outside the first period; and change the first on-duty ratios by changing switching timings of the first switching device and the second switching device in the first period and changing switching timings of the fourth switching device and the fifth switching device in the second period.

(6)

The power conversion apparatus according to any one of (1) to (5), in which the control circuit is configured to:

turn on the third switching device, in a period during which the second switching device is on, at a timing at which a predetermined time has elapsed from a timing of turning-off of the first switching device;

turn on the first switching device, in a period during which the third switching device is on, at a timing at which a predetermined time has elapsed from a timing of turning-off of the second switching device; and turn on the second switching device, in a period during which the first switching device is on, at a timing at which a predetermined time has elapsed from a timing of turning-off of the third switching device.

(7)

A power conversion apparatus including:

a first power terminal including a first coupling terminal and a second coupling terminal;

an arm provided on a path coupling the first coupling terminal and the second coupling terminal to each other, the arm including a first switching device provided between the first coupling terminal and a first node, a second switching device provided between the first node and a second node, and a third switching device provided between the second node and the second coupling terminal;

an inductor provided between the second node and a third node;

a first capacitor provided between the third node and the second coupling terminal;

a second capacitor provided between the first coupling terminal and a fourth node;

a third capacitor provided between the fourth node and the second coupling terminal;

a transformer including a first winding and a second winding, the first winding being provided on a path coupling the first node and the fourth node to each other;

a rectifying circuit including multiple rectifying devices coupled to the second winding;

a second power terminal coupled to the rectifying circuit and including a third coupling terminal and a fourth coupling terminal; and a control circuit configured to control a switching operation of the arm on a basis of a voltage at the second power terminal.

(8)

The power conversion apparatus according to (7), further including a resonant inductor and a resonant capacitor, the resonant inductor and the resonant capacitor being provided on the path coupling the first node and the fourth node to each other.

(9)

The power conversion apparatus according to (7) or (8), in which the control circuit is configured to control the switching operation to change first on-duty ratios of the first switching device and the second switching device on the basis of the voltage at the second power terminal and maintain a second on-duty ratio of the third switching device.

(10)

The power conversion apparatus according to (9), in which the control circuit is configured to:

turn on the third switching device in a first period; and change the first on-duty ratios by changing switching timings of the first switching device and the second switching device in the first period.

(11)

The power conversion apparatus according to any one of (7) to (10), in which the control circuit is configured to:

turn on the second switching device, in a period during which the first switching device is on, at a timing at which a predetermined time has elapsed from a timing of turning-off of the third switching device;

turn on the third switching device, in a period during which the second switching device is on, at a timing at which a predetermined time has elapsed from a timing of turning-off of the first switching device; and turn on the first switching device, in a period during which the third switching device is on, at a timing at which a predetermined time has elapsed from a timing of turning-off of the second switching device.

(12)

A power conversion system including:

the power conversion apparatus according to any one of (1) to (11); and a direct-current power supply apparatus coupled to the first power terminal of the power conversion apparatus.

The power conversion apparatus according to at least one embodiment of the disclosure and the power conversion system according to at least one embodiment of the disclosure each make it possible to widen the input voltage range.

The invention claimed is:

1. A power conversion apparatus comprising:
a first power terminal including a first coupling terminal and a second coupling terminal;
a first arm provided on a first path coupling the first coupling terminal and the second coupling terminal to each other, the first arm including a first switching device provided between the first coupling terminal and a first node, a second switching device provided between the first node and a second node, and a third switching device provided between the second node and the second coupling terminal;
a second arm provided on a second path coupling the first coupling terminal and the second coupling terminal to each other, the second arm including a fourth switching device provided between the first coupling terminal and a third node, a fifth switching device provided between the third node and a fourth node, and a sixth switching device provided between the fourth node and the second coupling terminal;
a first inductor provided between the second node and a fifth node;
a second inductor provided between the fourth node and the fifth node;
a first capacitor provided between the fifth node and the second coupling terminal;
a first transformer including a first winding and a second winding, the first winding being provided on a path coupling the first node and the third node to each other;
a rectifying circuit including multiple rectifying devices coupled to the second winding;
a second power terminal coupled to the rectifying circuit and including a third coupling terminal and a fourth coupling terminal; and
a control circuit configured to control switching operations of the first arm and the second arm on a basis of a voltage at the second power terminal.

2. The power conversion apparatus according to claim 1, further comprising a resonant inductor and a resonant capacitor, the resonant inductor and the resonant capacitor being provided on the path coupling the first node and the third node to each other.

3. The power conversion apparatus according to claim 1, wherein
the power conversion apparatus includes a second transformer including a first winding and a second winding,
the first winding of the second transformer comprises the first inductor, and
the second winding of the second transformer comprises the second inductor.

4. The power conversion apparatus according to claim 1, wherein the control circuit is configured to control the switching operations to change first on-duty ratios of the first switching device, the second switching device, the fourth switching device, and the fifth switching device on the basis of the voltage at the second power terminal and maintain second on-duty ratios of the third switching device and the sixth switching device.

5. The power conversion apparatus according to claim 4, wherein the control circuit is configured to:
turn on the third switching device in a first period;
turn on the sixth switching device in a second period outside the first period; and
change the first on-duty ratios by changing switching timings of the first switching device and the second switching device in the first period and changing switching timings of the fourth switching device and the fifth switching device in the second period.

6. The power conversion apparatus according to claim 1, wherein the control circuit is configured to:
turn on the third switching device, in a period during which the second switching device is on, at a timing at which a predetermined time has elapsed from a timing of turning-off of the first switching device;
turn on the first switching device, in a period during which the third switching device is on, at a timing at which a predetermined time has elapsed from a timing of turning-off of the second switching device; and
turn on the second switching device, in a period during which the first switching device is on, at a timing at which a predetermined time has elapsed from a timing of turning-off of the third switching device.

7. A power conversion system comprising:
the power conversion apparatus according to claim 1; and
a direct-current power supply apparatus coupled to the first power terminal of the power conversion apparatus.

8. A power conversion apparatus comprising:
a first power terminal including a first coupling terminal and a second coupling terminal;
an arm provided on a path coupling the first coupling terminal and the second coupling terminal to each other, the arm including a first switching device provided between the first coupling terminal and a first node, a second switching device provided between the first node and a second node, and a third switching device provided between the second node and the second coupling terminal;
an inductor provided between the second node and a third node;
a first capacitor provided between the third node and the second coupling terminal;
a second capacitor provided between the first coupling terminal and a fourth node;
a third capacitor provided between the fourth node and the second coupling terminal;
a transformer including a first winding and a second winding, the first winding being provided on a path coupling the first node and the fourth node to each other;

a rectifying circuit including multiple rectifying devices coupled to the second winding;

a second power terminal coupled to the rectifying circuit and including a third coupling terminal and a fourth coupling terminal; and a control circuit configured to control a switching operation of the arm on a basis of a voltage at the second power terminal.

9. The power conversion apparatus according to claim 8, further comprising a resonant inductor and a resonant capacitor, the resonant inductor and the resonant capacitor being provided on the path coupling the first node and the fourth node to each other.

10. The power conversion apparatus according to claim 8, wherein the control circuit is configured to control the switching operation to change first on-duty ratios of the first switching device and the second switching device on the basis of the voltage at the second power terminal and maintain a second on-duty ratio of the third switching device.

11. The power conversion apparatus according to claim 10, wherein the control circuit is configured to:

turn on the third switching device in a first period; and change the first on-duty ratios by changing switching timings of the first switching device and the second switching device in the first period.

12. The power conversion apparatus according to claim 8, wherein the control circuit is configured to:

turn on the second switching device, in a period during which the first switching device is on, at a timing at which a predetermined time has elapsed from a timing of turning-off of the third switching device;

turn on the third switching device, in a period during which the second switching device is on, at a timing at which a predetermined time has elapsed from a timing of turning-off of the first switching device; and turn on the first switching device, in a period during which the third switching device is on, at a timing at which a predetermined time has elapsed from a timing of turning-off of the second switching device.

13. A power conversion system comprising:

the power conversion apparatus according to claim 8; and a direct-current power supply apparatus coupled to the first power terminal of the power conversion apparatus.

* * * * *